(12) United States Patent
Choi et al.

(10) Patent No.: US 9,844,776 B2
(45) Date of Patent: Dec. 19, 2017

(54) METAL-SUPPORTED ANION EXCHANGE RESINS AND METHOD OF REMEDIATING TOXIC ANIONS USING THE SAME

(71) Applicant: KOREA ADVANCED INSTITUTE OF SCIENCE AND TECHNOLOGY, Daejeon (KR)

(72) Inventors: Minkee Choi, Daejeon (KR); You-Na Kim, Seoul (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 327 days.

(21) Appl. No.: 14/664,640

(22) Filed: Mar. 20, 2015

(65) Prior Publication Data
US 2015/0266015 A1   Sep. 24, 2015

(30) Foreign Application Priority Data
Mar. 20, 2014 (KR) .................. 10-2014-0032954

(51) Int. Cl.
*B01J 41/12* (2017.01)
*C02F 1/42* (2006.01)
(Continued)

(52) U.S. Cl.
CPC .............. *B01J 41/12* (2013.01); *C02F 1/42* (2013.01); *C02F 1/70* (2013.01);
(Continued)

(58) Field of Classification Search
None
See application file for complete search history.

(56) References Cited

U.S. PATENT DOCUMENTS 4,715,691 A * 12/1987 Sata .................. G02F 1/1525
                                              359/267

FOREIGN PATENT DOCUMENTS

JP       2014-030821 A    2/2014
KR  10-2014-0004576 A    1/2014

OTHER PUBLICATIONS

Abu-Omar et al., "Facile Abstraction of Successive Oxygen Atoms from Perchlorate Ions by Methylrhenium Dioxide", Inorganic Chemistry, 1995, vol. 34, No. 25, pp. 6239-6240.
(Continued)

*Primary Examiner* — Chester T Barry
(74) *Attorney, Agent, or Firm* — Knobbe Martens Olson & Bear LLP

(57) ABSTRACT

Provided are a method of removing a perchlorate ion ($ClO_4^-$) and a nitrate ion ($NO_3^-$) which are toxic anions in wastewater using an anion-exchange resin on which a metal is supported, and more particularly an anion-exchange resin on which a hydrogen activating metal is supported or a hydrogen activating metal and a secondary metal are supported together and a method of removing toxic anions using the same. The toxic anions may be efficiently ion-exchanged and removed using an anion-exchange resin supporting a reduction catalyst, the regeneration of the anion-exchange resin may be facilitated, and the consumption of energy and the reducing agent may be reduced, thereby being usable in removal of toxic anions from an actual water purification system.

35 Claims, 14 Drawing Sheets

(51) Int. Cl.
*C02F 1/70* (2006.01)
*C02F 101/12* (2006.01)
*C02F 101/16* (2006.01)

(52) U.S. Cl.
CPC .... *C02F 2001/422* (2013.01); *C02F 2101/12* (2013.01); *C02F 2101/163* (2013.01); *C02F 2303/16* (2013.01)

(56) References Cited

OTHER PUBLICATIONS

Abu-Omar et al., "Oxygen-Transfer Reactions of Methylrhenium Oxides", Inorganic Chemistry, 1996, vol. 35, No. 26, pp. 7751-7757.
Abu-Omar et al., "Clean and Efficient Catalytic Reduction of Perchlorate", Angew. Chemistry, 2000, No. 23, pp. 4480-4483.
McPherson et al., "Multielectron Atom Transfer Reactions of Perchlorate and Other Substrates Catalyzed by Rhenium Oxazoline and Thiazoline Complexes: Reaction Kinetics, Mechanisms, and Density Functional Theory Calculations", Inorganic Chemistry, 2004, vol. 43, No. 13, pp. 4036-4050.
Hurley et al., "Efficient Heterogeneous Catalytic Reduction of Perchlorate in Water", Environmental Science & Techonology, 2007, vol. 41, No. 6, pp. 2044-2049.
Wang et al., "Catalytic reduction of perchlorate by H2 gas in dilute aqueous solutions", Separation and Purification Technology, 2008, vol. 60, pp. 14-21.
Epron et al., "Catalytic Reduction of Nitrate and Nitrite on Pt—Cu/Al2O3 Catalysts in Aqueous Solution: Role of the Interaction between Copper and Platinum in the Reaction", Journal of Catalysis, 2001, vol. 198, pp. 309-318.
Horold et al., "Development of catalysts for a selective nitrate and nitrite removal from drinking water", Catalysis Today, 1993, vol. 17, pp. 21-30.
Horold et al., "Catalytical removal of nitrate and nitrite from drinking water: 1. Screening for hydrogenation catalysts and influence of reaction conditions on activity and selectivity", Environmental Technology, 1993, vol. 14, pp. 931-939.
Jung et al., "Development of Pd—Cu/Hematite Catalyst for Selective Nitrate Reduction", Environmental Science & Technology, 2014, vol. 48, pp. 9651-9658.
Kim et al., "Catalytic reduction of nitrate in water over Pd—Cu/TiO2catalyst: Effectof the strong metal-support interaction (SMSI) on the catalytic activity", Applied Catalysis B: Environmental, 2013, vol. 142-143, pp. 354-361.
Office Action dated Jul. 21, 2015 of corresponding Korean Patent Application No. 10-2014-0032954—8 pages.
Abu-Omar et al., "Clean and Efficient Catalytic Reduction of Perchlorate", Angewandte Chemie International Edition 2000, vol. 39, No. 23, pp. 4310-4313.
Arias et al., "Kinetics and Mechanisms of Catalytic Oxygen Atom Transfer with Oxorhenium(V) Oxazoline Complexes", Inorganic Chemistry, 2001, vol. 40, pp. 2185-2192.
Palomares et al., "Using the "memory effect" of Hydrotalcites for Improving the Catalytic Reduction of Nitrates in Water", Journal of Catalysis, 2004, vol. 221, pp. 62-66.
Prusse et al., "Supported Bimetallic Palladium Catalysts for Water-phase Nitrate Reduction", Journal of Molecular Catalysis A: Chemical, 2001, vol. 173, pp. 313-328.
Pintar et al., "Catalytic Hydrogenation of Aqueous Nitrate Solutions in Fixed-bed Reactors", Catalysis Today, 1999, vol. 53, pp. 35-50.
Palomares et al., "Nitrates Removal from Polluted Aquifers using (Sn or Cu)/Pd Catalysts in a Continuous Reactor", Catalysis Today, 2010, vol. 149, pp. 348-351.
Palomares et al., "A Study of Different Supports for the Catalytic Reduction of Nitrates from Natural Water with a Continuous Reactor", Catalysis Today, 2011, vol. 172, pp. 90-94.
Pintar et al., "Integrated ion exchange/catalytic process for efficient removal of nitrates from drinking water", Chemical Engineering Science, 2001, vol. 56, pp. 1551-1559.

\* cited by examiner

METAL-SUPPORTED ANION EXCHANGE RESINS AND METHOD OF REMEDIATING TOXIC ANIONS USING THE SAME

TECHNICAL FIELD

The present disclosure relates to a method of removing a perchlorate ion ($ClO_4^-$) and a nitrate ion ($NO_3^-$) which are toxic anions in wastewater using an anion-exchange resin on which a metal is supported, and more particularly to an anion-exchange resin on which a hydrogen activating metal is supported and a method of removing toxic anions using the same.

BACKGROUND ART

Among various toxic anions dissolved in wastewater, a perchlorate ion ($ClO_4^-$) and a nitrate ion ($NO_3^-$) may be removed environmentally friendly by converting $ClO_4^-$ and $NO_3^-$ to non-toxic $Cl^-$ and $N_2$, respectively, by a chemical reduction reaction as following Reaction Formula 1:

[Reaction Formula 1]

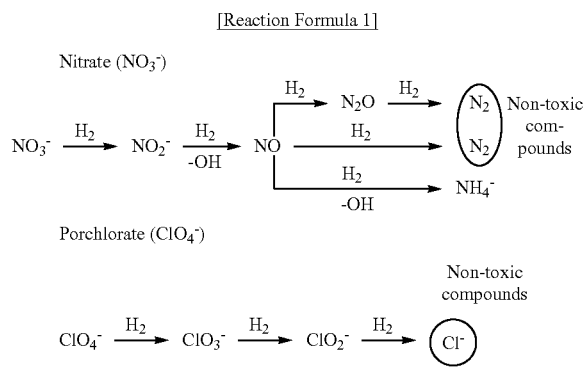

Various treatment technologies for removal of those anions have been reported so far, which can be classified into three general categories: (1) physical treatment, (2) bioremediation with microorganisms, and (3) catalytic reduction.

Each method has its own strengths and weaknesses. Physical separation methods such as ion exchange can allow fast and selective removal of anions from waste water containing other competing ions. However, a large volume of brine solution is required for the regeneration of saturated ion-exchange resin, which requires a secondary treatment process for decomposing the highly concentrated $ClO_4^-$ and $NO_3^-$ in the brine solution.

In contrast to the case of ion-exchange process, biological denitrification can permanently degrade $ClO_4^-$ and $NO_3^-$ into harmless chloride ion ($Cl^-$) and nitrogen gas ($N_2$), respectively. However, in the case of $ClO_4^-$, biological processes can be costly for the treatment of water containing low-concentration $ClO_4^-$ because a highly reducing environment is required. Also, in the case of $NO_3^-$, the denitrifying bacteria require an organic carbon nutrient that must be added to the water being treated. The biological denitrification, either heterotrophic or autotrophic produces excessive biomass of the released bacterial cells as well as remnant carbon source, which requires intensive post-treatment process including several filtration steps and subsequent disinfection.

Similar to the biological denitrification, catalytic reduction in a liquid-phase by using $H_2$ as a reducing agent can also permanently decompose $ClO_4^-$ and $NO_3^-$. From a thermodynamic viewpoint, $ClO_4^-$ is a strong oxidizing agent having a redox potential of +1.38 eV and hence can be permanently reduced to $Cl^-$. However, the reduction is kinetically retarded because of its high activation energy (120 kJ/mol). Therefore, overcoming this energy barrier by using catalysts can permanently reduce $ClO_4^-$ to $Cl^-$ in reductive conditions. Among these, Abu-Omar et al. reported the high catalytic activity of Re-based homogeneous catalysts in the presence of $H_3PO_2$ and organic sulfide as reducing agents (Abu-Omar, M. M. Inorg. Chem. 1995, 34, 6239-6240, Inorg. Chme. 1996, 35, 7751-7757, Angew. Chem. Int. Ed. 2000, 39, 4310-4313, Inorg. Chem. 2001, 40, 2185-2192, Inorg. Chem. 2004, 43, 4036-4050.). Re(V) complex can react relatively rapidly with $ClO_4^-$ by an oxygen transfer reaction to form a Re(VII) complex, which can be reduced back to the Re(V) complex by the reducing agents. However, such a homogeneous catalyst with a soluble phosphorus or sulfur reducing agent is not readily compatible with water purification systems. As a heterogeneous version of Re catalysts, a supported Pd—Re bimetallic catalyst was also developed (Hurley, K. D. Environ. Sci. Technol. 2007, 41, 2044-2049). The catalyst, smartly combining the hydrogen activation ability of Pd and the oxygen transfer ability of Re, demonstrated reasonably fast reduction of $ClO_4^-$ with $H_2$ at acidic pH (pH<3). Nevertheless, all the Re-based catalysts still require significant improvements in catalyst activity and stability, especially at near-neutral pH. Wang et al. investigated $ClO_4^-$ reduction with 78 different catalysts by using $H_2$ as a reducing agent (Wang, D. M. Sep. Purif. Technol. 2008, 60, 14-21.), but none of the catalysts showed an appreciable reaction rate at near-neutral pH.

In the case of $NO_3^-$, it has been reported that noble metal catalysts (Pd, Pt and Rh) promoted with secondary metals (Cu, Sn, and In) can efficiently reduce $NO_3^-$, wherein PdCu bimetallic catalyst is widely accepted as the most active and selective combination (Jung, S. Environ. Sci. Technol. 2014, 48, 9651-9658, Kim, M. S. App. Catal. B: Environ. 2013. 142-143, 354-361, Palomares, A. E. J. Catal. 2004, 221, 62-66, Hörold, S. Environ. Technol. 1993, 14, 931-939, Hörold, S. Catal. Today, 1993, 17, 21-30.) It was proposed that the catalytic reaction takes place via a $NO_2^-$ intermediate (Epron, F. J. Catal. 2001, 198, 309-318, Hörold, S. Catal. Today, 1993, 17, 21-30, Prüsse, U. J. Mol. Catal. A: Chem. 2001, 173, 313-328), wherein promoting metals such as Cu are responsible for the $NO_3^-$ conversion into $NO_2^-$ (Hörold, S. Environ. Technol. 1993, 14, 931-939, Epron, F. J. Catal. 2001, 198, 309-318, Hörold, S. Catal. Today, 1993, 17, 21-30, Prüsse, U. J. Mol. Catal. A: Chem. 2001, 173, 313-328). It has been reported that noble metals such as Pd and Pt do not present activity for $NO_3^-$ reduction, but they can convert $NO_2^-$ into $N_2$ or $NH_4^+$ (Hörold, S. Environ. Technol. 1993, 14, 931-939, Epron, F. J. Catal. 2001, 198, 309-318, Hörold, S. Catal. Today, 1993, 17, 21-30, Prüsse, U. J. Mol. Catal. A: Chem. 2001, 173, 313-328). Noble metals also re-reduce the promoting metals by providing activated hydrogens (i.e., hydrogen spillover from Pd to Cu). As the reaction proceeded, one and two $OH^-$ ions should be generated as one $N_2$ and $NH_4^+$ are generated, respectively, in order to maintain charge neutrality. However, so far most of catalytic studies were carried out using a batch reactor for fundamental investigations, which is not highly relevant for continuous treatment of waste water. Catalytic $NO_3^-$ reduction with PdCu catalyst in a continuous-flow reactor showed that $NO_3^-$ conversion is relatively low (Pintar, A. Catal. Today, 1999, 53, 35-50) and undesired $NH_4^+$ are too much formed (Pintar, A. *Catal. Today*, 1999, 53, 35-50, Palomares, A. E. *Catal. Today*, 2010, 149, 348-351, Palomares, A. E. *Catal. Today*, 2011, 172, 90-94), which indicated that a direct use of up-to-date PdCu catalysts is not yet highly practical. In order to overcome the limited catalytic activity and possible contamination of water with $NH_4^+$, Pintar et al. combined catalytic degradation with an ion-exchange process: NaCl brine solution was used for the regeneration of $NO_3^-$-saturated ion-exchange resin and the highly concentrated $NO_3^-$ in the brine solution was catalytically reduced (Pintar, A. *Chem. Eng. Sci.*, 2001, 56, 1551-1559). In principle, the integrated process can decrease the amount of waste brine produced and there is also lower risk that the side products of catalytic reduction such as $NO_2^-$ and $NH_4^+$ can directly affect water quality.

SUMMARY

An aspect of the present invention is to provide an anion-exchange resin on which a hydrogen activating is supported or a hydrogen activating metal and a secondary metal are supported together.

Another aspect of the present invention is to provide a method of preparing an anion-exchange resin on which a hydrogen activating metal is supported or a hydrogen activating metal and a secondary metal are supported together.

Still another aspect of the present invention is to provide a method of removing toxic anions, allowing a repetitive ion-exchange/regeneration process, by using an anion-exchange resin on which a hydrogen activating metal is supported or a hydrogen activating metal and a secondary metal are supported together.

One aspect of the present invention provides an anion-exchange resin on which a hydrogen activating metal is supported or a hydrogen activating metal and a secondary metal are supported together, in the form of M/IX-L or M-S/IX-L, wherein M is a hydrogen activating metal; IX is an anion-exchange resin; L is a reducing agent which reduces a hydrogen activating metal supported on the anion-exchange resin; and S is a secondary metal.

Another aspect of the present invention further provides a method of preparing an anion-exchange resin on which a hydrogen activating metal is supported or a hydrogen activating metal and a secondary metal are supported together, including (a) exchanging a negatively charged hydrogen activating metal precursor with an anion present in an anion-exchange resin to support the metal; and (b) reducing the hydrogen activating metal supported on the anion-exchange resin using a reducing agent.

A further aspect of the present invention further provides a method of removing toxic anions allowing a circulation process, including ion-exchange of toxic anions using the anion-exchange resin on which a hydrogen activating metal is supported or a hydrogen activating metal and a secondary metal are supported together, and reducing the anion-exchange resin using a reducing agent, when anion exchange capacity of the anion-exchange anion on which the hydrogen activating metal is supported, is saturated.

EMBODIMENTS

Figure 1:
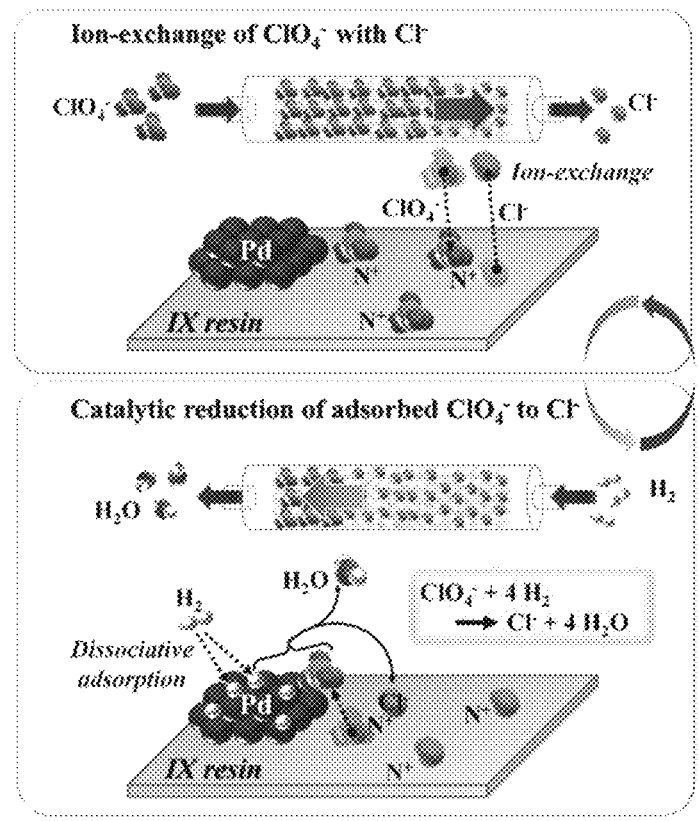
FIG. 1 schematically shows schematic representation of the integration of (a) $ClO_4^-$ ion-exchange and (b) catalytic reduction of adsorbed $ClO_4^-$ using Pd-supported ion-exchange resin as an adsorption/catalysis bifunctional material.

The following description should be understood as describing embodiments of the present invention, and the present invention is not necessarily limited thereto. Further, the accompanying drawings are intended to help understanding, and the present invention is not limited thereto. Details on the individual elements may be understood properly by the spirit detailed in the following related description.

Unless otherwise defined, all technical and scientific terms used herein have the same meaning as commonly understood by a person skilled in the art to which the present invention pertains. In general, the terminology used herein is well-known in the art and commonly used.

The terms used in the present specification may be defined as follows.

"Hydrogen activating metal" refers to a metal capable of forming hydrogen activated by the contact with molecular hydrogen in a broad sense, that is, dissociated hydrogen.

"Secondary metal" refers to a metal belonging to a non-precious metal, and supported together with a hydrogen activating metal.

One aspect of the invention provides synergistic integration of ion-exchange and catalytic decomposition by using metal supported ion-exchange resin as an ion-exchange/catalysis bifunctional material. After the resin is saturated with anions in an ion-exchange process, the concentrate $ClO_4^-$ and $NO_3^-$ in the resin can be fully reduced to $Cl^-$ and $N_2$ by the catalytic function of catalysts supported on the resin. The present process can allow a synergistic utilization of the benefits of ion-exchange and catalytic reduction, that is, fast and selective capture of anions ($ClO_4^-$ and $NO_3^-$) even in the presence of competing ions and permanent chemical degradation of anions into non-toxic $Cl^-$ and $N_2$. Because anions ($ClO_4^-$ and $NO_3^-$) are decomposed as ion-exchanged on the resin, the present process does not require the use of brine solution at all for the resin regeneration.

In another aspect of the present invention, by developing a method of supporting a hydrogen activating metal on an anion-exchange resin, an anion-exchange resin on which a novel ion exchange/catalysis bifunctional materials combining an ion exchange property and a catalysis property is synthesized so that an economical method of removing toxic anions of ion-exchange/catalytic reduction/ion-exchange processes may be developed.

Still in another aspect of the present invention relates to an anion-exchange resin on which a hydrogen activating metal, or a hydrogen activating metal and a secondary metal is supported, capable of removing toxic anions, in the form of M/IX-L or M-S/IX-L, wherein M is a hydrogen activating metal; IX is an anion-exchange resin; L is a reducing agent which reduces a hydrogen activating metal supported on the anion-exchange resin; and S is a secondary metal.

In embodiments of the present invention, the hydrogen activating metal (M) may be one or more selected from the group consisting of Groups IB, VIIB and VIII metals. In one embodiment, the hydrogen activating metal (M) may be one or more selected from the group consisting of Pd, Rh, Ir and Pt.

In embodiments of the present invention, the secondary metal (S) may be one or more selected from the group consisting of Ag, Fe, Hg, Ni, Cu, Zn, Sn and In, in addition of the hydrogen activating metal.

In embodiments of the present invention, the reducing agent (L) may be hydride or alcohol. The hydride may be one or more selected from the group consisting of hydrogen gas, carbon monoxide, sodium borohydride and sodium citrate, and the alcohol may be one or more selected from the group consisting of methanol, ethanol, ethylene glycol and glycerol.

In embodiments of the present invention, the anion-exchange resin may have an ion-exchange group having an ion exchange function stably bonded to a parent polymer compound having a three-dimensional structure by a covalent bond, so as to be evenly fixed and distributed on a resin surface.

The anion-exchange resin on which a hydrogen activating metal is supported may support the hydrogen activating metal in a ratio of 0.01 to 50 wt %. If the supporting ratio of a metal cluster is 0.01 wt % or less, the ion-exchange performance of a toxic anion is very poor, and if the ratio is 50 wt % or more, the cost per ion-exchange performance of toxic anions is excessively increased.

The parent polymer of the anion-exchange resin corresponds to a parent body to introduce a hybrid polymer or an ion exchange group therein, and the hybrid polymer may be acryl and styrene, or styrene and divinylbenzene.

In embodiments of the present invention, an ion-exchange material to be introduced to a parent body of the anion-exchange resin may be one or more selected from the group consisting of weak basic groups including a primary amine group, a secondary amine group and a tertiary amine group, and strong basic groups including a quaternary ammonium group.

Yet another aspect of the present invention relates to a method of preparing an anion-exchange resin on which a hydrogen activating metal, or a hydrogen activating metal and a secondary metal is supported, including (a) exchanging a negatively charged hydrogen activating metal precursor or a hydrogen activating metal precursor and a secondary metal precursor with an anion present in an anion-exchange resin to support the metal; and (b) reducing the hydrogen activating metal or the hydrogen activating metal and the secondary metal supported on the anion-exchange resin using a reducing agent.

In embodiments of the present invention, the anions present in the anion-exchange resin may be a chloride ion ($Cl^-$) or a hydroxide ion ($OH^-$).

In embodiments of the present invention, the reducing agent may be hydride or alcohol, and the hydride may be one or more selected from the group consisting of hydrogen gas, carbon monoxide, sodium borohydride and sodium citrate, and the alcohol may be one or more selected from the group consisting of methanol, ethanol, ethylene glycol and glycerol.

After step (a), a step of placing the anion-exchange resin on which the hydrogen activating metal is supported in a solution containing NaOH or KOH, and stirring the solution may be further included.

In above step (b), organic polymerizates or an oligomer material which is a metal stabilizing material to prevent an aggregation phenomenon of metal nanoparticles in the solution containing the metal precursor, and form metal nanoparticles having a small particle size, may be further added, wherein the organic polymerizates may be one or more selected from the group consisting of polyvinyl alcohol, polyvinylpyrrolidone, polyvinyl ether and cyclodextrine, and step (b) may have an above metal stabilizing material concentration of 0.1-100 equivalent to the supported metal concentration, and be carried out at 20 to 150° C.

The hydrogen activating metal may be one or more metals selected from the group consisting of Groups IB, VIIB and VIII metals. In embodiments, the hydrogen activating metal may be one or more metals selected from the group consisting of Pd, Rh, Ir and Pt.

The secondary metal may be one or more metals selected from the group consisting of Ag, Fe, Hg, Ni, Cu, Zn, Sn and In, in addition to the hydrogen activating metal.

Still another aspect of the present invention relates to a method of removing toxic anions, capable of a circulation process, including (a) ion-exchange of toxic anions using the anion-exchange resin on which the hydrogen activating metal is supported; and (b) reducing the anion-exchange resin using a reducing agent, when the anion exchange capacity of the anion-exchange resin on which the hydrogen activating metal is supported is saturated.

In embodiments of the present invention, above steps (a) and (b) may be repetitively carried out, using the anion-exchange resin on which the hydrogen activating metal is supported, reduced in above step (b).

The toxic anion may be a perchlorate ion ($ClO_4^-$) or a nitrate ion ($NO_3^-$).

The toxic anion may be an anion including an oxyanion such as $NO_3^-$, $NO_2^-$, $BrO_3^-$, $ClO_3^-$ or $ClO_4^-$ in addition to the perchlorate ion ($ClO_4^-$) or nitrate ion ($NO_3^-$).

According to embodiments of the present invention, a method of removing toxic anions using the ion-exchange resin on which the hydrogen activating metal is supported may be initiated by concentrating toxic anions ($ClO_4^-$, $NO_3^-$) within an aqueous solution, using the anion-exchange resin on which the hydrogen activating metal having ion exchange and catalyst properties is supported, synthesized for being used in a circulation process first, as shown in FIG. 1.

Herein, the anion-exchange resin on which the hydrogen activating metal is supported, designated in embodiments of the present invention, may be provided through above steps (a) and (b).

Herein, acidic materials including $CO_2$, HCOOH or $CH_3COOH$ may be further added in above step (b), in addition to the reducing agent of step (b).

When the decomposition of toxic anions saturated and ion-exchanged of anions on the anion-exchange resin on which the hydrogen activating metal is supported, is completed, the anion-exchange resin on which the hydrogen activating metal is supported, regenerated in above step (c) may be reused in the toxic anion exchange process. Based on the above processes, a circulation process of ion-exchange/catalytic reduction/ion-exchange, using the anion-exchange resin on which the hydrogen activating metal is supported, may be carried out.

In embodiments of the present invention, the above process may be carried out in batch-type or in column-type reactors.

In embodiments of the present invention, the reducing agent in above step (b) may be hydrogen gas or formic acid, and the reduction may be carried out at 20 to 150° C., under a dry or wet condition. Further, the solvent under the wet condition during the reduction procedure of above step (b), may be one or more selected from the group consisting of water, methanol, ethanol and a solvent having lower polarity or lower dielectric constant than water.

Herein, the kind of the solvent used under the wet condition may be various solvents having different dielectric constants, but the reason why a material having lower dielectric constant than water is used is that an interaction with the anion-exchange resin becomes stronger, and thus, the ion-exchanged anions are easily moved from ion-exchanged points to points for catalytic reduction, so that the decomposition of the ion-exchanged toxic anions by reaction with dissociated hydrogen produced at point for catalysis, is facilitated.

The toxic anions ($ClO_4^-$, $NO_3^-$) present in the solution in above step (a) are partly exchanged with counter anions previously ion-exchanged on the anion-exchange resin ($Cl^-$ or $OH^-$), and ion-exchanged on the anion-exchange resin. The following reaction formula is an example of a binary exchange reaction.

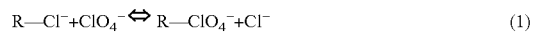

wherein $R-Cl^-$, $R-ClO_4^-$, and $R-NO_3^-$ are $Cl^-$, $ClO_4^-$, and $NO_3^-$ bonded to the anion exchange resin.

When the anion exchange capacity within anion-exchange resin on which the hydrogen activating metal is supported, is saturated, in above step (b), the anions ion-exchanged on the resin is reduced in gaseous (using $H_2$ as a reducing agent) or liquid phase (using formic acid as a reducing agent) at an appropriate decomposition temperature under a dry or wet condition of the anion-exchange resin on which the hydrogen activating metal is supported, and in the reaction, a metal cluster within the anion-exchange resin on which the hydrogen activating metal is supported may function as a catalyst.

Hereinafter, embodiments of the present invention will be described in detail by the following Examples. These Examples are provided to illustrate embodiments of the present invention more specifically, and it is evident to a person skilled in the art that the scope of the present invention is not limited to those Examples.

Example 1: Preparation of Anion-Exchange Resin on which Hydrogen Activating Metal is Supported For supporting Pd clusters on the resin, $[PdCl_4]^{2-}$ ions were first ion-exchanged on the resin. In a typical synthesis for supporting 2 wt % Pd, 1 L of $3.8 \times 10^{-3}$ M $[PdCl_4]^{2-}$ aqueous solution was prepared by dissolving $PdCl_2$ ($3.8 \times 10^{-3}$=1) in 1 L of 0.17 M HCl solution. 20 g of dry ion-exchange resin (38 g by wet resin basis) was suspended in the resultant solution and stirred at room temperature for 6 h. The resin was collected by filtration, washed thoroughly with deionized water and gently dried at 333 K. The ion-exchange resin loaded with $[PdCl_4]^{2-}$ was reduced by two different methods, i.e., reduction with $H_2$ and ethanol reduction. In the $H_2$ reduction, the resin was placed in a plug-flow Pyrex reactor and treated under $H_2$ (flow rate=50 mL/min/g) at 373 K for 2 h. After reduction, the reactor was purged with He (flow rate=50 mL/min/g) for 2 h at 373 K and cooled down to room temperature. In the ethanol reduction, 1 g of $[PdCl_4]^{2-}$-exchanged sample was suspended in 15 mL 0.05 M NaOH aqueous solution (mol of $OH^-$ added was equal to mol of $Cl^-$ in $[PdCl_4]^{2-}$) and reacted at room temperature for 30 min. Then, 15 mL ethanol was added to this suspension and refluxed for 3 h. The resultant sample was collected by filtration, thoroughly washed with deionized water and dried at 333 K.

In the $H_2$ reduction, the resin was placed in a plug-flow Pyrex reactor and treated under dry $H_2$ gas at 373 K. In the wet ethanol reduction, the $[PdCl_4]^{2-}$-exchanged resin was suspended in NaOH/water/ethanol mixture and refluxed for 3 h. In this method, NaOH is used as a source for $OH^-$ that reacts with the ion-exchanged $[PdCl_4]^{2-}$ to form $Pd(II)(OH)_x$ which is more readily reducible than $[PdCl_4]^{2-}$. It was confirmed that Pd cannot be reduced without NaOH addition under the same condition. Ethanol reduces the $Pd(II)(OH)_x$ species to Pd(0) clusters while it is oxidized to acetaldehyde.

The material reduced by ethanol like this is referred to as Pd/IX-E, and a material wherein $[PdCl_4]^{2-}$ is reduced by hydrogen is referred to as Pd/IX-H.

Figure 2:
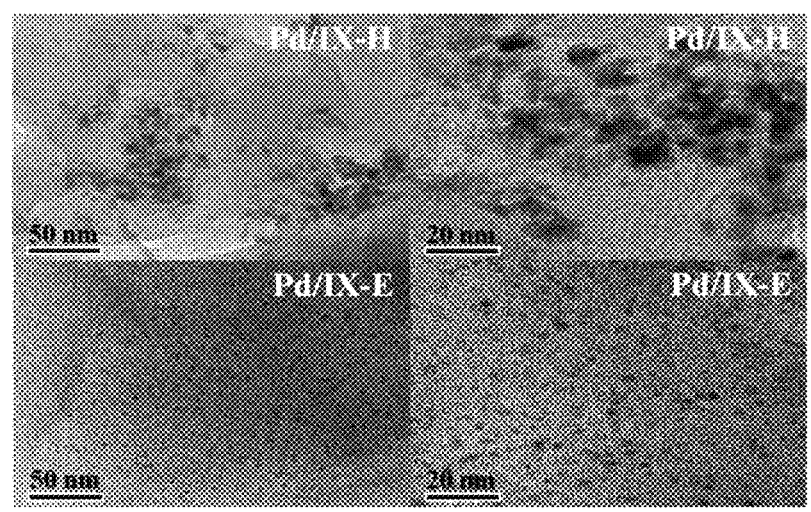
FIG. 2 is transmission electron micrographs (TEM) of a material having ion-exchanged Pd on an anion-exchange resin, reduced by ethanol (Pd/IX-E), and a material having ion-exchanged Pd on an anion-exchange resin, reduced by hydrogen gas (Pd/IX-H), according to Example 1 of the present invention.

In order to confirm the finally supported Pd amount on Pd/IX-H and Pd/IX-E, an ICP-MS (Inductively Coupled Plasma Mass Spectrometry) analysis proceeded. Elemental analysis using ICP-MS revealed that 1.9 wt % and 2.0 wt % Pd were respectively supported on Pd/IX-H and Pd/IX-E samples. Because a $PdCl_2$ precursor corresponding to 2.0 wt % Pd was initially added for catalyst preparation, the ICP-MS results indicate that almost all of the Pd is recovered in the resin. Next, as shown in FIG. 2, transmission electron micrographs (TEM) of Pd/IX-H and Pd/IX-E show the following. The metal (Pd) supported on Pd/IX-H is aggregated to each other in a non-uniform size, which confirms that sintering occurred significantly in the metal reduction procedure. On the contrary, in the image of Pd/IX-E, it is recognized that small uniform sized Pd clusters are distributed throughout the anion-exchange resin, and through the result of Histogram, it was confirmed that Pd clusters have diameters of a uniform distribution of 0.5-3.0 nm.

Figure 3:
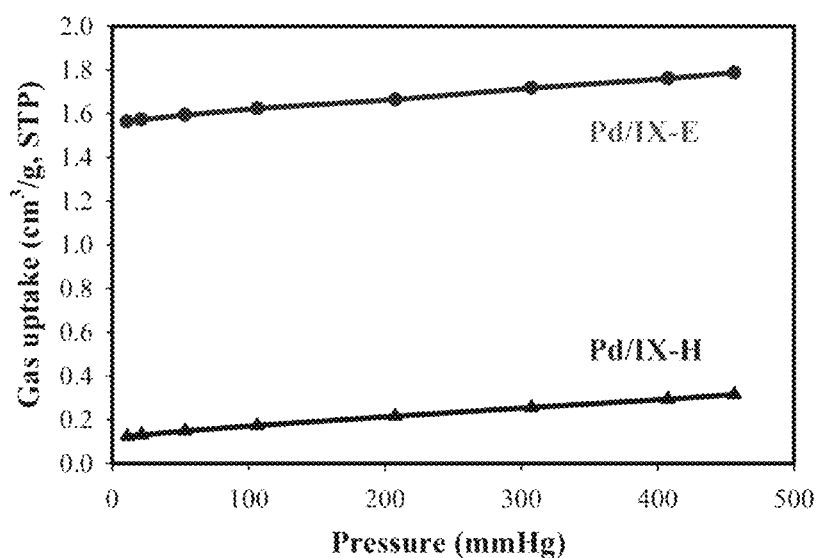
FIG. 3 is a graph representing $O_2$ chemical adsorption amounts of a material having ion-exchanged Pd on an anion-exchange resin, reduced by ethanol (Pd/IX-E), and a material having ion-exchanged Pd on an anion-exchange resin, reduced by hydrogen gas (Pd/IX-H), according to Example 1 of the present invention.

In order to get more quantitative information on the number of catalytically active Pd surfaces, the fractional Pd dispersion (defined as 'number of surface Pd atoms/number of total Pd atoms') was also analyzed by $O_2$ chemisorption at 308 K. As a result, the dispersion degree of Pd/IX-H was 0.06, and the dispersion degree of Pd/IX-E was 0.74, as shown in FIG. 3. This means that Pd/IX-E has metal (Pd) atoms exposed to the surface which are about 12 times more than the Pd atoms of Pd/IX-H.

Taken together, based on the TEM analysis and the chemical adsorption amount of $O_2$, it is confirmed that the Pd cluster supported on Pd/IX-E has a size of average of 2 nm or less, and high dispersion.

Example 2: Ion-Exchanged Amounts of Perchlorate Ion Over Time

In order to confirm anion ion-exchange ability and ion selectivity of Pd/IX-H and Pd/IX-E prepared in Example 1, an anion exchange experiment was carried out with an anion-exchange resin (IX) not supporting the metal cluster, an anion-exchange resin (Pd/IX-H) supporting 2 wt % of metal (Pd) by reducing Pd with hydrogen gas, or an anion-exchange resin (Pd/IX-E) supporting 2 wt % of metal (Pd) by reducing Pd by an alcohol reduction method. Herein, in the case of IX, the ion-exchange experiment immediately proceeded, while in the case of Pd/IX-H and Pd/IX-E, their weights were measured in a dried state, and they were pre-swelled for 24 hours in distilled water under a condition of room temperature before ion-exchange process, thereby preventing the ion-exchange speed from being lower due to a dried sample.

In order to confirm the ion-exchanged $ClO_4^-$ amount over time in the anion-exchange resin on which the hydrogen activating metal is supported, an ion-exchange experiment of the $ClO_4^-$ was carried out with batch-type reactor. Herein, the ion-exchange experiment proceeded in a simulated solution containing a higher concentration of sulphate (1000 mg/L $SO_4^{2-}$) as compared with a lower concentration of perchlorate (10 mg/L $ClO_4^-$), thereby comparing the ion-exchanged $ClO_4^-$ amount and the selectivity to $ClO_4^-$ for each sample.

Figure 4:
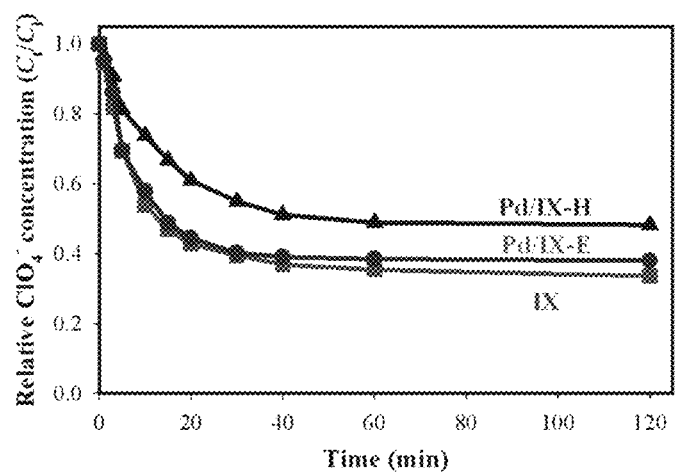
FIG. 4 is a graph comparing ion-exchanged amounts of $ClO_4^-$ over time on an anion-exchange resin (IX) not supporting Pd, Pd/IX-H and Pd/IX-E, according to Example 2 of the present invention.

Each 0.04 g of IX, Pd/IX-H and Pd/IX-E in a dry state was added to 1 L of the simulated solution and stirred, then a certain amount of the solutions was taken every 1, 3, 5, 10, 15, 20, 30, 40, 60 and 120 minutes, and $ClO_4^-$ amount remaining in the solution after ion-exchange was analyzed by an ion chromatography device. The ion-exchanged $ClO_4^-$ amount of each material was calculated by obtaining the difference between the $ClO_4^-$ concentration of an initial solution and the remaining $ClO_4^-$ concentration after a certain reaction time. As a result, it was confirmed that IX, Pd/IX-H and Pd/IX-E all 95% or more $ClO_4^-$ of the total amount of the $ClO_4^-$ are ion-exchanged within 1 hour, and after 120 minutes, all $ClO_4^-$ present in the solution was ion-exchanged on the resin (FIG. 4).

Example 3: Anion Exchange Experiment of Anion-Exchange Resin on which Hydrogen Activating Metal is Supported In order to confirm anion ion-exchange ability and ion selectivity of Pd/IX-H and Pd/IX-E prepared in Example 1, the $ClO_4^-$ removal ratios depending on the sample amounts of an anion-exchange resin (IX) not supporting the metal cluster, an anion-exchange resin (Pd/IX-H) supporting 2 wt % of metal (Pd) by reducing Pd with hydrogen gas, or an anion-exchange resin (Pd/IX-E) supporting 2 wt % of metal (Pd) by reducing Pd by an alcohol reduction method, were compared.

In the present ion-exchange experiment, each ion-exchange experiment proceeded in a pure solution only containing perchlorate (10 mg/L, $ClO_4^-$), and a simulated solution containing a high concentration of sulphate (1000 mg/L, $SO_4^{2-}$), thereby confirming the effect on the ion-exchange capacity when competent ions are present in addition to $ClO_4^-$.

The ion-exchange experiment proceeded while IX, Pd/IX-H and Pd/IX-E with varied amount in a dry state in each 1 L of a pure solution and a simulated solution were stirred for 6 hours, respectively, wherein the final ion-exchanged amount is calculated by the following equation:

$$q=(C_i-C_t)V/m \qquad (2)$$

wherein $C_i$ is an anion concentration of the initial solution, $C_t$ is an anion concentration of the solution after ion-exchange, V is a solution volume, and m is a weight of the ion-exchange material in a dry state.

Figure 5A:
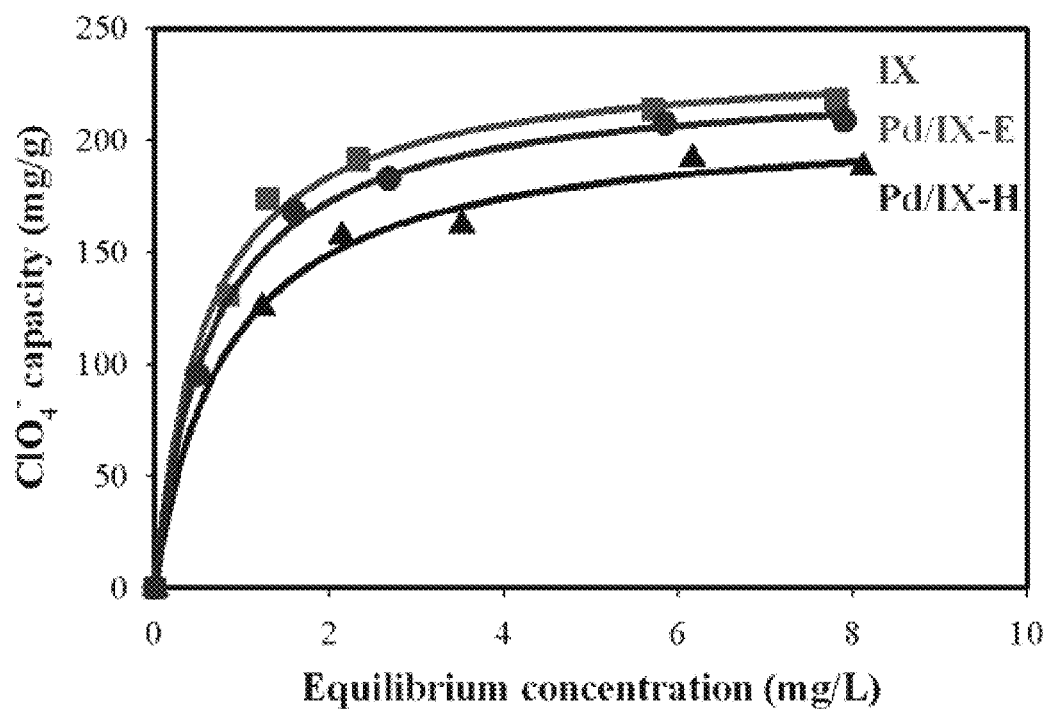
FIGS. 5(a) and 5(b) are graphs comparing ion-exchange capacity and selectivity for $ClO_4^-$ of IX, Pd/IX-H and Pd/IX-E under a $ClO_4^-$ equilibrium concentration according to Example 3 of the present invention, wherein 5(a) represents an experimental result in a pure solution, and 5(b) represents an experimental result in a simulated solution.
Figure 5B:
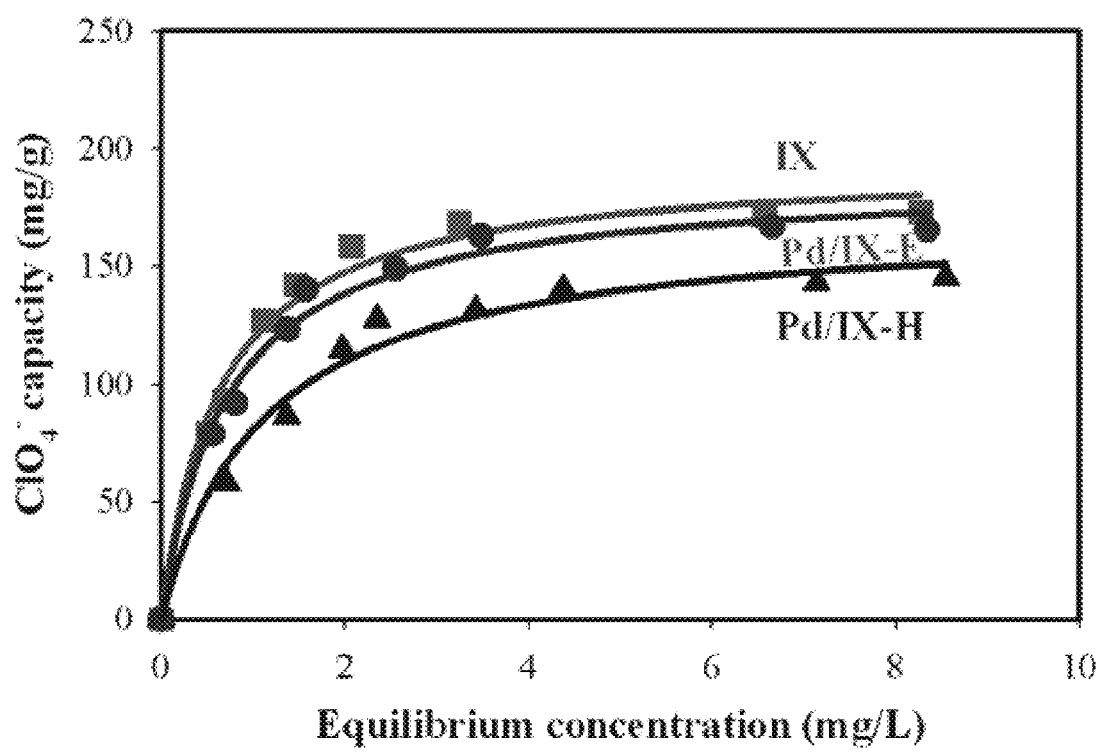

As shown in FIG. 5, the $ClO_4^-$ ion-exchange data of three materials under the equilibrium concentration were fitted to a Langmuir adsorption isotherm, and the results were analyzed. The Langmuir adsorption isotherm is as follows:

$$q_e=q_{max}KC_e/(1+KC_e) \qquad (3)$$

wherein $q_e$ is an ion-exchanged amount of $ClO_4^-$ (mg/g), $C_e$ is an equilibrium concentration (mg/L), $q_{max}$ is a maximum ion-exchanged amount (mg/g), and K is a Langmuir constant (mg/g) relating to intensity for ion-exchange. As a result of interpreting the results, the anion exchange-resin without a metal cluster (IX) represented a maximum ion-exchange amount in a pure solution 22% higher than the simulated solution, and a K value was only 8% higher. In the simulated solution, though a very high concentration of a competent ion (1000 mg/L $SO_4^{2-}$) was present, differently from the pure solution, $q_{max}$ and K values did not represent a significant difference, which means that the anion-exchange resin has very high selectivity to $ClO_4^-$. The ion-exchange result of Pd/IX-E shows that the ion-exchange capacity of the original anion-exchange resin was not significantly affected, in case of using ethanol as a reducing agent for supporting a metal (Pd). However, in the case of Pd/IX-H, significantly lowered $q_{max}$ and K values show that the ion selectivity as well as the ion-exchanged amount was affected.

Example 4: Reduction Degree of Perchlorate Ion Depending on Time and Solvent Kind According to various studies, the reduction of the $ClO_4^-$ by hydrogen gas is regarded as being a very slow procedure, in the kinetic point of view, due to large activation energy. This is because the hydrogen gas is difficult to attract electrons around four oxygen atoms of $ClO_4^-$. However, it was considered that in case of using hydrogen activating metal having a reduction function, lowering activation energy will make the reduction of $ClO_4^-$ faster, and thus, a study comparing decomposition degrees and decomposition time of ion-exchanged $ClO_4^-$ of the anion-exchange resin not supporting a metal (IX), the anion-exchange resin supporting 2 wt % of a metal (Pd) (Pd/IX-H) by reducing Pd with hydrogen gas, and the anion-exchange resin supporting 2 wt % of a metal (Pd) (Pd/IX-E) by reducing Pd by an alcohol reduction method, was performed.

As an experiment method, first, each 0.2 g of dried IX, Pd/IX-H and Pd/IX-E was added to 100 mg/L of a $ClO_4^-$ solution, and the solution was stirred at room temperature for 6 hours, thereby sufficiently ion-exchanged $ClO_4^-$ on each material. The initial ion-exchange amount of each material was calculated by obtaining the difference between the $ClO_4^-$ concentration of an initial solution and the remaining $ClO_4^-$ concentration after a certain reaction time. The anion-exchange resins completing the reaction were filtered and taken, and dried at 333 K for 2 hours. Each of the materials after drying was added to a stainless steel reactor, and sufficiently soaked in two kinds of different solvents (water or ethanol), and then hydrogen gas was flowed for 10 minutes, and pressure of 10 bar was filled and maintained. Herein, the temperature of the reactor was raised to 373 K, and maintained for determined decomposition reaction time (6, 12, 24, 36 hours), and then the reactor was cooled to room temperature, and the materials completing the reaction were taken, and dried at 333 K. Further, each 0.2 g of the materials was added to a 100 mg/L $ClO_4^-$ solution, as in the first ion-exchange experiment, and stirred at room temperature for 6 hours, and then the difference between the $ClO_4^-$ concentration in the initial solution and the $ClO_4^-$ concentration remaining in the solution after 6 hours was obtained to calculate the ion-exchanged amount again. Herein, the re-ion-exchanged $ClO_4^-$ amount was assumed to be a decomposed $ClO_4^-$ amount, and the decomposition rate shown in FIG. 6 was calculated by dividing the re-ion-exchanged $ClO_4^-$ amount by the initial ion-exchanged amount.

In order to reduce the ion-exchanged $ClO_4^-$ on the anion-exchange resin, the supported metal (Pd) cluster should function as a catalyst, so that the produced dissociated active hydrogen and the ion-exchanged $ClO_4^-$ react on the metal (pd) surface. However, since the $ClO_4^-$ is ion-exchanged on a quaternary ammonium group which is an ion-exchange point of the anion-exchange resin, continuous movement to the metal (Pd) surface producing activated hydrogen should be made, wherein if the movement speed is slow, a $ClO_4^-$ decomposition rate also becomes slow. Therefore, in embodiments of the present invention it was intended to confirm when solvents having different properties from each other (water or ethanol) were added in the decomposition procedure, how each solvent affected the movement speed and the decomposition rate of the ion-exchanged $ClO_4^-$.

Figure 6A:
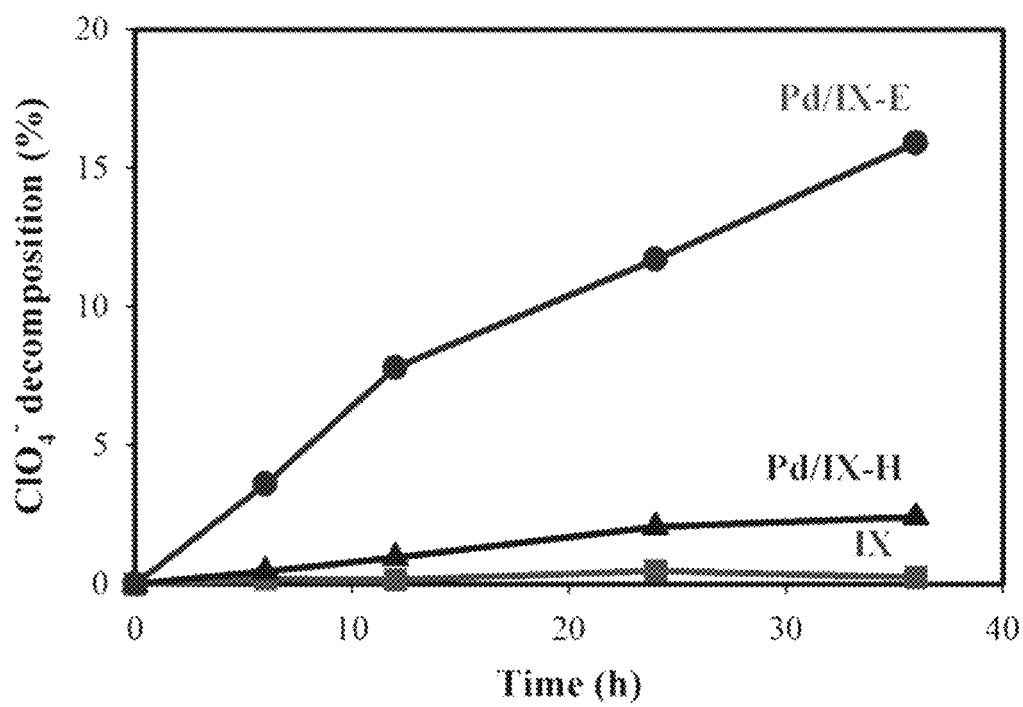
FIGS. 6(a) and 6(b) are graphs comparing the degrees of catalytic decomposition of pre-adsorbed $ClO_4^-$ under 10 bar $H_2$ at 373 K. (a) The resins were pre-wetted with water, and (b) ethanol before the catalytic decomposition. After ion-exchange of $ClO_4^-$ on IX, Pd/IX-H and Pd/IX-E, according to Example 4 of the present invention.
Figure 6B:
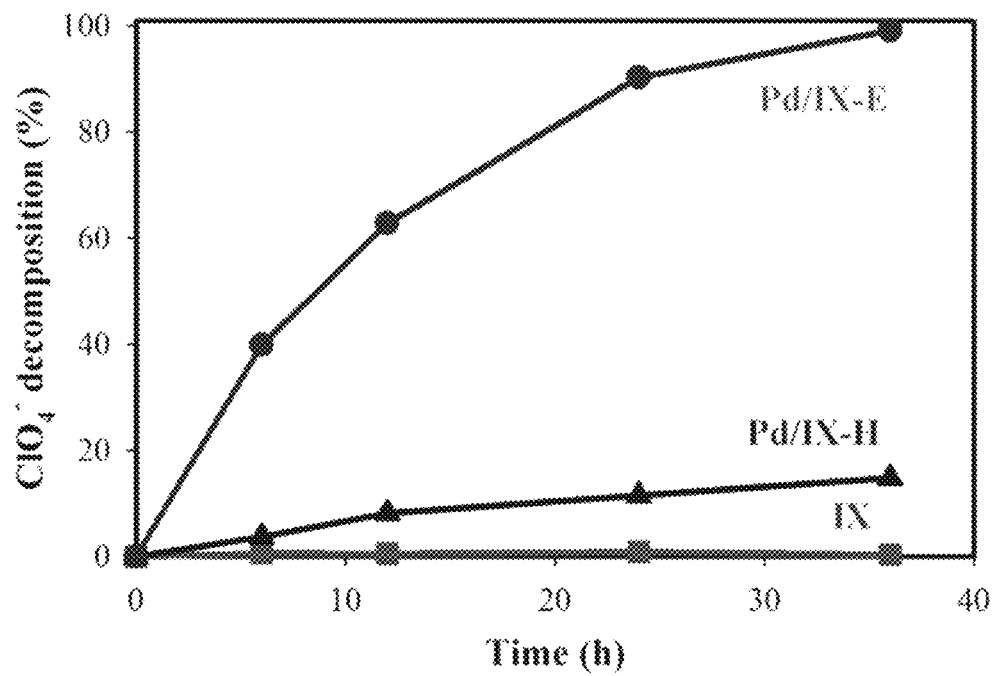

FIG. 6 shows the decomposition degree of $ClO_4^-$ at 373 K under hydrogen of 10 bar, during each different reaction time. The results show that certainly in the case of the anion-exchange resin not supporting a metal (Pd) (IX), the ion-exchanged $ClO_4^-$ was not decomposed at all during the decomposition time of 36 hours. That is, it was confirmed that in the decomposition reaction of the ion-exchanged $ClO_4^-$, the presence of the metal (Pd) cluster producing active hydrogen is very important. Next, when comparing the decomposition results of Pd/IX-H and Pd/IX-E, Pd/IX-E always showed significantly faster $ClO_4^-$ decomposition rate, regardless of the kinds of added solvents, and when comparing the decomposition ratios for the first 6 hours, the values were about 10 times higher than that of Pd/IX-H. It is determined that the difference in the decomposition degree between Pd/IX-H and Pd/IX-E is caused by the properties of the metal (Pd) cluster supported on each material, as confirmed in Example 1. In the results for $O_2$ chemical adsorption amount, the size of the metal (Pd) supported on Pd/IX-E was very small, and the metal (Pd) atom number on the active surface was about 12 times more than that of Pd/IX-H, and thus, higher Pd dispersion was showed. That is, it is considered that the decomposition ratio of the ion-exchanged $ClO_4^-$ on the anion-exchange resin is nearly proportional to an accessible metal (Pd) surface area.

Meanwhile, both Pd/IX-H and Pd/IX-E showed higher decomposition ratios when ethanol is added as a solvent, rather than water, and this may be because the $ClO_4^-$ has very low hydration energy ($\Delta G^{\circ}$-205 kJ/mol), and is strongly bonded to the hydrophobic anion-exchange resin, and thus, when water is present, the $ClO_4^-$ does not freely move on the surface of the anion-exchange resin. However, ethanol has lower polarity and a lower dielectric constant than water, and thus, more strongly interacts with the anion-exchange resin, thereby making the interaction between the anion-exchange resin and the $ClO_4^-$ rather weak. In practice, there is a research result that if ethanol is added when the ion-exchanged $ClO_4^-$ on the ion-exchange resin was dropped to a regeneration solution, detachment may be facilitated. As such, embodiments of the present invention disclose that the physical properties of the solvents which are added to soak the anion-exchange resin, affect the speed of the ion-exchanged $ClO_4^-$ on the ion-exchange point of the anion-exchange resin, being moved to the metal (Pd) catalyst point, thereby eventually affecting the $ClO_4^-$ decomposition rate.

In addition, analysis of the anion concentration on Pd/IX-E during the $ClO_4^-$ decomposition procedure proceeded, and as shown in the following Reaction Formula, as the $ClO_4^-$ decomposition preceded, it was observed whether the concentration of ion-exchanged $ClO_4^-$ is decreased, and the concentration of chloride ion ($Cl^-$) which is a decomposition product is increased. The Reaction Formula thereon is as follows:

$$ClO_4^- + 4H_2 \rightarrow Cl^- + 4H_2O \qquad (4)$$

Figure 7:
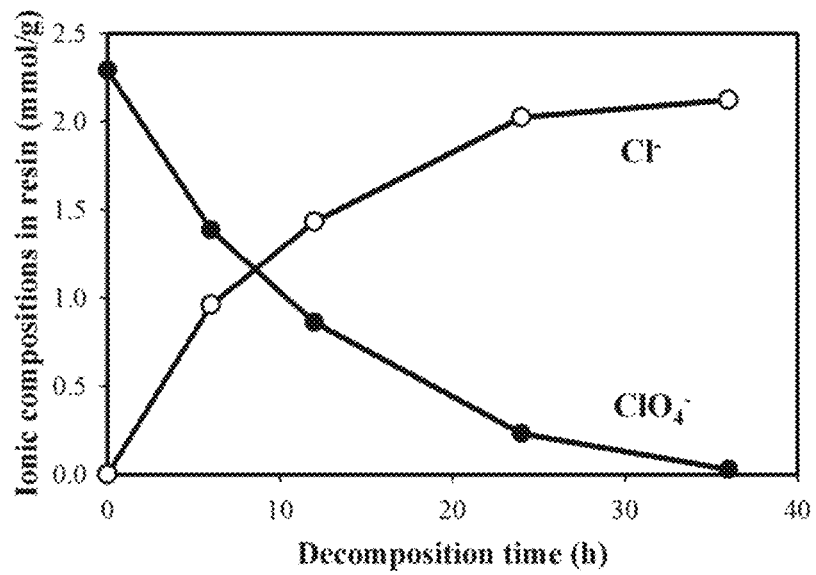
FIG. 7 is a graph representing change of the mole number of $ClO_4^-$ and chloride ions ($Cl^-$) over $ClO_4^-$ decomposition time on Pd/IX-E according to Example 4 of the present invention. (solvent: ethanol, reducing agent: hydrogen, reaction temperature: 373K, reaction time: 36 h)

As a result, as shown in FIG. 7, the $ClO_4^-$ concentration was decreased, the concentration of chloride ion ($Cl^-$) which is a final product was increased, during the $ClO_4^-$ reduction procedure, however, it was confirmed that a hypochlorite ion ($ClO^-$), a chlorine dioxide ion ($ClO_2^-$) and a chlorate ion ($ClO_3^-$) which are intermediate products in a kinetically unstable state were not detected. Further, it is recognized that the $ClO_4^-$ is completely decomposed to a chloride ion ($Cl^-$) through step (b) according to embodiments of the present invention, from the fact that the mole number of the chloride ion ($Cl^-$) is increased by the mole number of the decomposed $ClO_4^-$.

Figure 8:
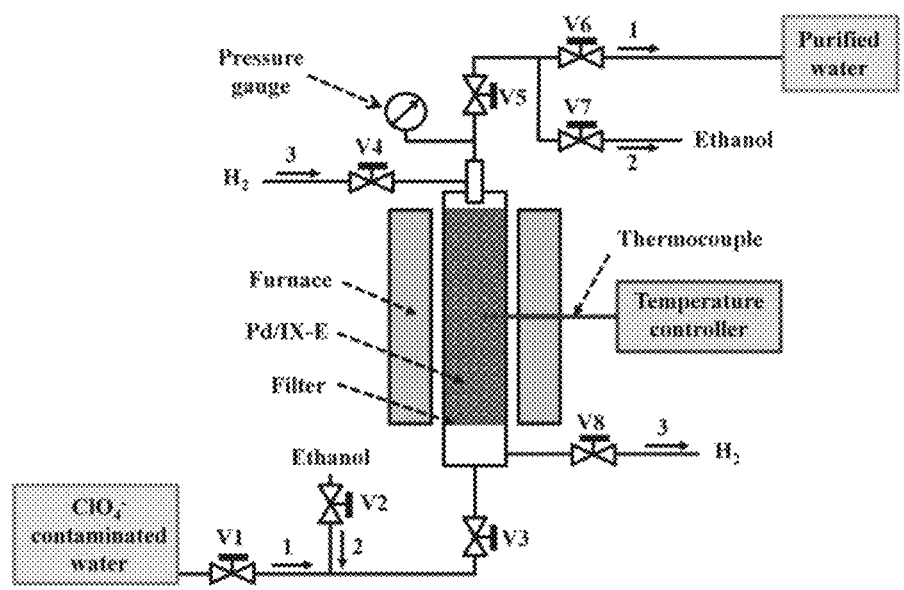
FIG. 8 is a schematic view of an ion-exchange/catalytic reduction cyclic process using a column-type reactor according to Example 5 of the present invention.

Example 5: Observation of Functional Change of Anion-Exchange Resin on which Hydrogen Activating Metal is Supported by Ion-Exchange/Catalytic Reduction Cyclic Experiment In order to confirm whether Pd/IX-H and Pd/IX-E prepared in Example 1 may be generally applied to an actual circulation process, and at the same time, whether the ion-exchange capacity and the decomposition capacity of the anion-exchange resin on which the hydrogen activating metal is supported in the course of the repetitive process, is lowered or not, an ion-exchange/catalytic reduction cyclic experiment was carried out using that column reactor shown in FIG. 8. First, a column was filled with 6 g of dry Pd/IX-E, and an ion-exchange reaction proceeded in a liquid phase, while a stimulated solution was flowed at a rate of 40 BV/h in up-flow. Analysis of whether $ClO_4^-$ is detected in the solution coming out through the column at regular intervals was carried out by ion chromatography, and after the detected $ClO_4^-$ concentration became similar to the concentration in the initial injected solution, the ion-exchange reaction was stopped. Thereafter, while 3 BV of ethanol was flowed, the anion-exchanged resin on which the hydrogen activating metal is supported within the column was made to be sufficiently soaked in the ethanol solvent, and a valve for inflow and outflow of liquid was closed, and then a hydrogen gas line was opened thereby flowing hydrogen for 5 minutes in down-flow. Thereafter, the outflow part valve of the hydrogen gas line was closed, and hydrogen pressure of 10 bar was maintained in the column, while a decomposition reaction proceeded at 373 K for 36 hours. After the reaction, the column was cooled to room temperature, and a simulated solution was flowed again to proceed with a secondary ion-exchange step, which was repeated 5 times.

Figure 9:
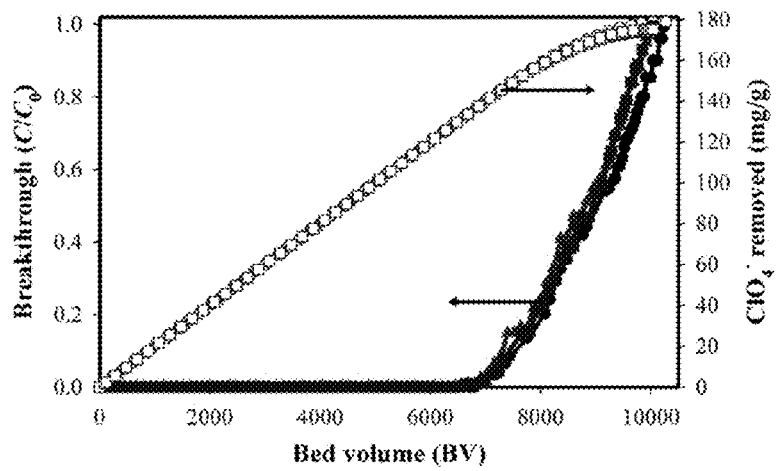
FIG. 9 shows an amount of $ClO_4^-$ ion-exchanged on Pd/IX-E, and a volume of a $ClO_4^-$ solution treated in each cycle, during an ion-exchange/catalytic reduction cyclic process according to Example 5 of the present invention.
Figure 10:
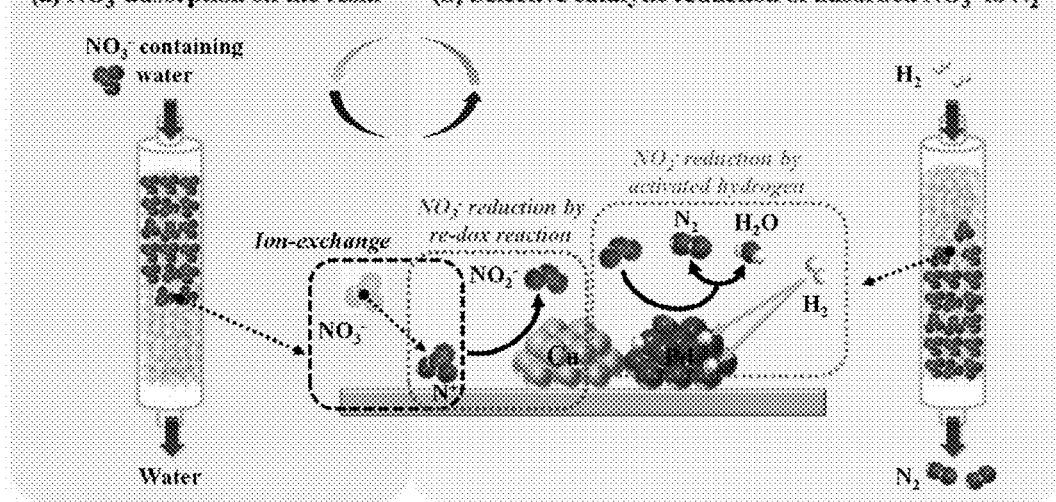
FIG. 10 schematically shows an ion-exchange/catalytic reduction mechanism of anions using a synthesized ion-exchange/catalysis bifunctional material. These are exploded schematic views of (a) ion-exchange of a $NO_3^-$ and (b) the reduction of ion-exchanged $NO_3^-$ by Pd and Cu catalysts, as an example 1.
Figure 11A:
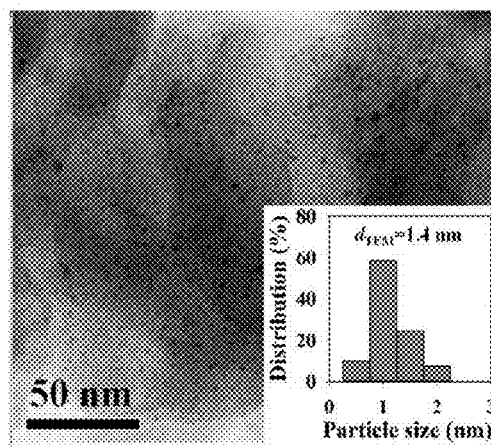
FIGS. 11(a) to 11(d) are transmission electron micrographs (TEM) and EDX mapping photographs of a material having ion-exchanged Pd on an anion-exchange resin, reduced by ethanol (Pd/IX-E), and a material having Pd and Cu on an anion-exchange resin, supported by a sequential ethanol reduction method (Pd—Cu/IX-E), according to Example 6 of the present invention.
Figure 11B:
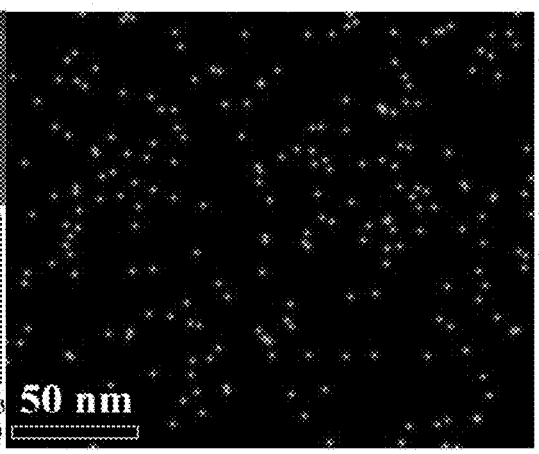
Figure 11C:
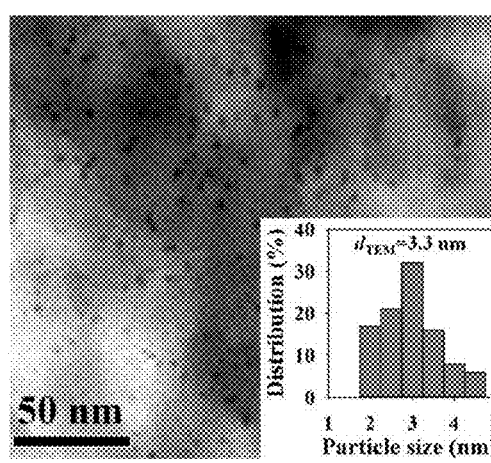
Figure 11D:
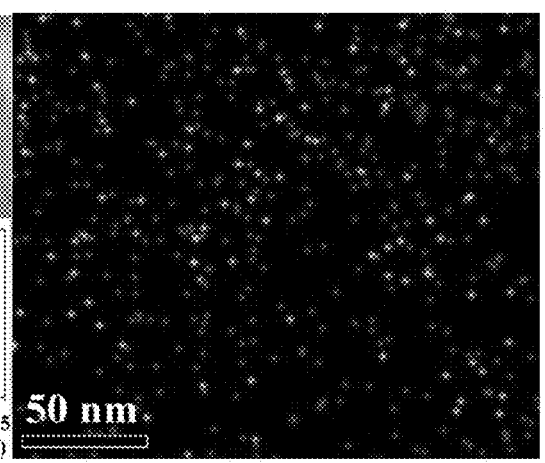

As a result, as represented in FIG. 9, $ClO_4^-$ was initially detected at about 6,800 BV, in the first ion-exchange step, and $ClO_4^-$ in the simulated solution of 10,000 BV was completely ion-exchange so as to be removed. During 5 repetitive experiments, the ion-exchange capacity of the anion-exchange resin on which the hydrogen activating metal is supported was not decreased, and about 174-179 mg/g of a $ClO_4^-$ was ion-exchanged every cycle. That is, even in the case of applying the anion-exchange resin on which the hydrogen activating metal is supported to an actual water purification system using the system of FIG. 8, the functionality of the anion-exchange resin on which the hydrogen activating metal is supported is not changed, and continuous use thereof is considered to be possible.

Example 6: Preparation of Anion-Exchange Resin on which Hydrogen Activating Metal is Supported or Hydrogen Activating Metal and Secondary Metal are Supported Together $[PdCl_4]^{2-}$ ions were first ion-exchanged on the resin to support ~1 wt % Pd. Typically, 1 L of $1.9 \times 10^{-3}$ M $[PdCl_4]^{2-}$ aqueous solution was prepared by dissolving 0.34 g $PdCl_2$ ($1.9 \times 10^{-3}$ mol) in 1 L of 0.084 M HCl aqueous solution. 20 g ion-exchange resin on dry basis was suspended in the resultant solution and stirred at room temperature for 6 h. Almost complete ion-exchange of $[PdCl_4]^{2-}$ is possible. The resin was collected by filtration, washed thoroughly with deionized water and gently dried at 333 K overnight. 1 g of the $[PdCl_4]^{2-}$-exchanged resin was suspended in 15 mL 0.033 M NaOH aqueous solution and stirred at room temperature for 30 min. Then, 15 mL ethanol was added to this suspension as a reducing agent for Pd and refluxed for 3 h. The resultant sample was collected by filtration, thoroughly washed with deionized water, and dried at 333 K. The resultant Pd-supported ion-exchange resin is denoted as 'Pd/IX-E'. In order to support Cu, 1 g of Pd/IX-E sample was further suspended in 10 mL of ethanol containing $1.6 \times 10^{-2}$ M $Cu(NO_3)_2 \cdot 3H_2O$ and refluxed for 3 h. The resultant sample was collected by filtration, thoroughly washed with deionized water, and dried at 333 K. The resultant sample contained 1 wt % Pd and 1 wt % Cu (Cu/Pd mass ratio of 1) according to inductively coupled plasma-mass spectroscopy (ICP-MS) analysis and denoted as Pd—Cu/IX-E_1. In order to study the effect of Cu/Pd alloying ratio on the $NO_3^-$ reduction activities, Pd—Cu/IX-E_1 with 1 wt % Pd and different Cu contents were additionally prepared. The varied Cu loading was carried out as mentioned above, but by using a Cu ethanol solution with different concentrations of $Cu(NO_3)_2 \cdot 3H_2O$ in the range of $2.7 \times 10^{-3}$–$2.2 \times 10^{-2}$ M.

In order to confirm the amounts of Pd and Cu finally supported in Pd/IX-E and the materials on each of which different amount of Cu was further supported, ICP-MS (inductively coupled plasma mass spectrometry) analysis proceeded. Accordingly, the mass fraction of Cu/Pd was calculated, and each sample was referred to as Pd—Cu/IX-E_x, wherein x is the mass fraction of Cu/Pd. As a result, materials having Cu/Pd mass fractions of 0.17-1.44 were synthesized. Among these, it was found that only 1.0 wt % of Pd is present in Pd/IX-E, and 1.0 wt % of Pd and Cu were supported on Pd—Cu/IX-E_1, respectively. This shows that both Pd and Cu are supported on the anion-exchange resin in initially added amounts.

Next, Transmission electron microscopy (TEM) and energy-dispersive X-ray spectroscopy (EDX) investigations were carried out using a JEM-ARM200F spherical aberration corrected scanning transmission electron microscope (Cs-corrected STEM, JEOL) operated at 200 kV acceleration voltage after mounting the samples on a gold TEM grids (300 mesh) using acetone dispersion. Surface-area-weighted mean metal cluster diameter was determined with TEM analysis of ~200 metal clusters by using $d_{TEM}=\Sigma n_i d_i^3/\Sigma n_i d_i^2$, where $n_i$ is the number of crystallites having a diameter of $d_i$. As shown in FIG. 11, the present Pd/IX-E sample synthesized using a $NO_3^-$-selective resin also showed the presence of highly dispersed Pd clusters having very uniform size distribution in the range of 0.5-2.0 nm. Surface-area-weighted mean cluster diameter ($d_{TEM}$) was determined to be 1.4 nm (inset of FIG. 11a). TEM investigation (FIG. 11c) revealed that still most of metal clusters possess very small diameters of 2.0-4.5 nm and surface-area-weighted mean cluster diameter ($d_{TEM}$) was determined to be 3.3 nm (inset of FIG. 11c). EDX mapping (FIG. 11d) showed that both of Pd and Cu are well dispersed over the ion-exchange resin. It is noteworthy that none of Cu could be deposited on Pd-free ion-exchange resin using the same ethanol reduction method, which indicates that Cu is fixated on the resin by the catalytic action of Pd. We propose that activated hydrogen generated on the surface of Pd catalyst through the catalytic decomposition of ethanol was used to reduce $Cu^{2+}$ into $Cu(0)$.

Figure 12:
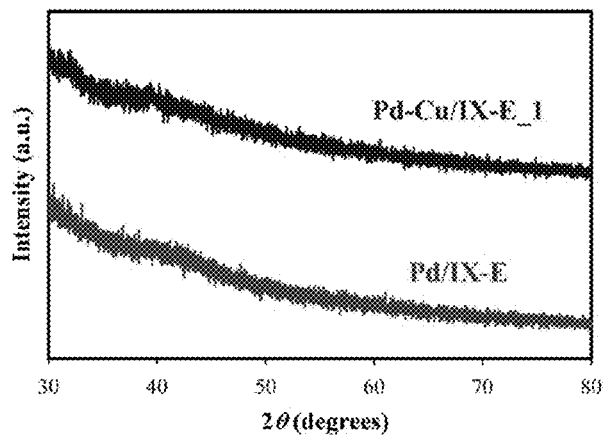
FIG. 12 shows an X-ray diffraction (XRD) analysis result of a material having ion-exchanged Pd on an anion-exchange resin, reduced by ethanol (Pd/IX-E), and a material having Pd and Cu on an anion-exchange resin, supported by a sequential ethanol reduction method (Pd—Cu/IX-E), according to Example 6 of the present invention.
Figure 13A:
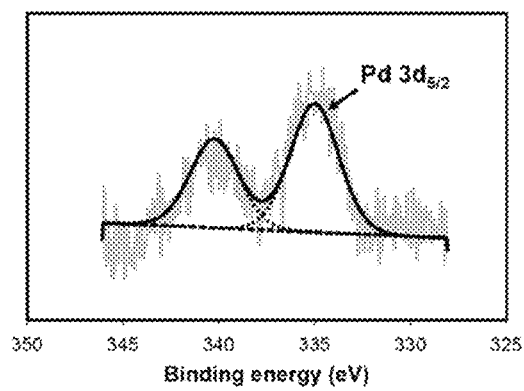
FIGS. 13(a) to 13(d) show X-ray photoelectron spectroscopy (XPS) analysis results of a material having ion-exchanged Pd on an anion-exchange resin, reduced by ethanol (Pd/IX-E), and a material having Pd and Cu, supported by a sequential ethanol reduction method (Pd—Cu/IX-E), synthesized according to Example 6 of the present invention.
Figure 13B:
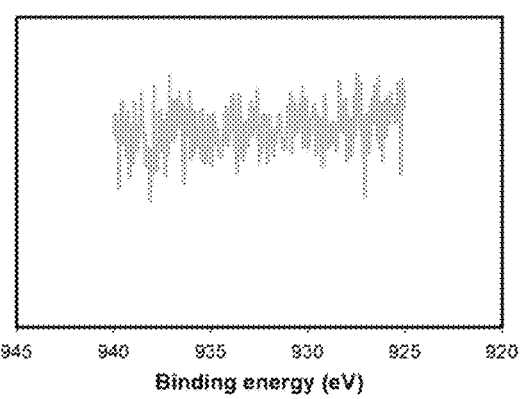
Figure 13C:
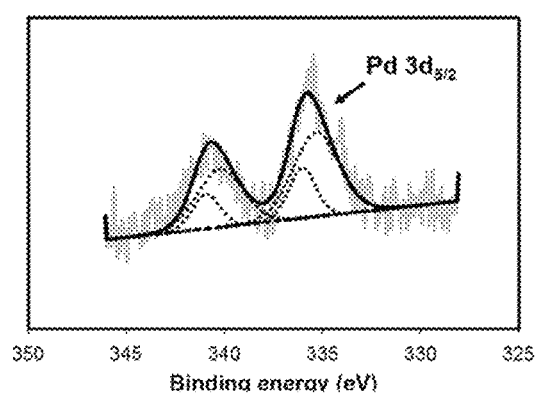
Figure 13D:
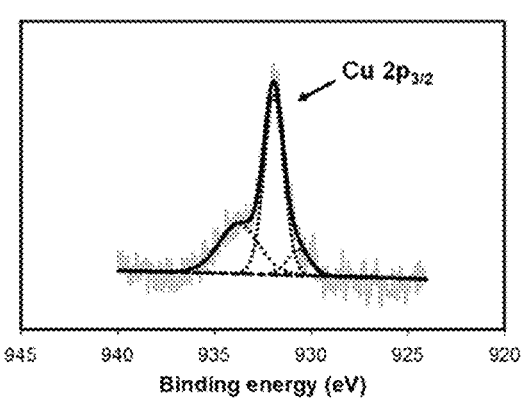

Further, Pd/IX-E and Pd—Cu/IX-E_1 samples showed no characteristic XRD peak for both Pd and Cu species (FIG. 12), which indicates only the presence of highly dispersed metal species. This result is consistent with the aforementioned TEM observations.

Example 7: Ion-Exchanged Amount of Nitrate Ion Over Time

In order to confirm the anion-exchange capacity and the ion selectivity of Pd—Cu/IX-E_1 prepared in Example 6, the anion-exchange resin not supporting a metal cluster (IX), and the anion-exchange resin further supporting 1 wt % of Cu on Pd/IX-E (Pd—Cu/IX-E_1) were used in the anion-exchange experiment. $NO_3^-$ ion-exchange properties of the ion-exchange resin samples were investigated via batch experiments. In the case of pristine ion-exchange resin (IX), wet resin was directly used for ion-exchange experiments. In the cases of metal-loaded resins, dried Pd—Cu/IX-E_1 samples were pre-wetted in deionized water at room temperature for 24 h before all ion-exchange experiments. It should be noted that a direct use of dried resins for ion-exchange leads to very slow ion-exchange kinetics. Forion-exchange experiments, two different $NO_3^-$ aqueous solutions containing 100 mg/L of $NO_3^-$ were used. One solution was prepared by dissolving $NaNO_3$ in deionized water and denoted as 'pure solution'. The other solution was prepared by dissolving $NaNO_3$ in a simulated ionic background solution containing 100 mg/L of $SO_4^{2-}$ ($Na_2SO_4$), 100 mg/L of $Cl^-$ (NaCl), and 100 mg of $HCO_3^-$ ($NaHCO_3$), which is denoted as 'simulated solution'. For kinetic analysis of $NO_3^-$ ion-exchange, 750 mg of the samples on dry basis were added to 1 L of the pure and simulated $NO_3^-$ solutions. After magnetic stirring (400 rpm) for specified time intervals at room temperature, a part of solution was collected and solids were removed using a PVDF syringe filter (Whatman, 0.2 µm). The $NO_3^-$ concentration in the solution was analyzed using a Dionex ion-exchange chromatography (IC) system (ICS-2100), equipped with a 500 µL sample loop, a set of 4×250 mm AS20 and 4×50 mm AG20 columns, a 4 mm ASRS 300 suppressor, and an electrical conductivity detector. The suppressor current was 38 mA and the eluent was set to 15 mM KOH. With this setup, the detection limit for $NO_3^-$ was 0.01 mg/L.

Figure 14:
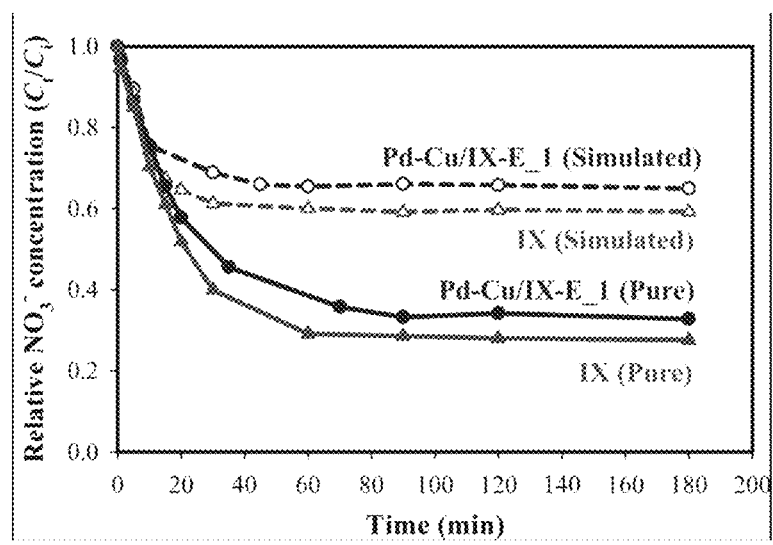
FIG. 14 is a graph comparing ion-exchanged amounts of a $NO_3^-$ over time of an anion-exchange resin not supporting a metal (IX) and Pd—Cu/IX-E, according to Example 7 of the present invention. Herein, the experimental results are those in both a pure solution and a simulated solution.

FIG. 14 shows the kinetics of $NO_3^-$ ion-exchange on IX and Pd—Cu/IX-E_1 samples in both a pure (100 mg/L of $NO_3^-$) and a simulated $NO_3^-$ solution (100 mg/L of $NO_3^-$, $SO_4^{2-}$, $Cl^-$, and $HCO_3^-$). Within 90 min, 95% of $NO_3^-$ ion-exchange was completed for all the samples in both solutions. Based on the result, all data points in $NO_3^-$ ion-exchange isotherms were measured after 6 h equilibration time, which is long enough to assume completely equilibrated states.

Example 8: Anion Ion-Exchange Experiment of Anion-Exchange Resin on which Hydrogen Activating Metal is Supported or Hydrogen Activating Metal and Secondary Metal are Supported Together In order to confirm the anion ion-exchange capacity and the ion selectivity of IX and Pd—Cu/IX-E_1 prepared in Example 6, the $NO_3^-$ removal rates depending on the sample amounts of the anion-exchange resin not supporting a metal cluster (IX), and the anion-exchange resin further supporting 1 wt % of Cu on Pd/IX-E (Pd—Cu/IX-E_1) were compared.

For collecting $NO_3^-$ ion-exchange isotherms, 25-2250 mg samples on dry weight basis were added to 1 L of $NO_3^-$ solutions and stirred for 6 h. The $NO_3^-$ concentration in the supernatant was analyzed by IC. The amount of ion-exchanged $NO_3^-$, q (mg/g), was calculated as follows:

$$q=(C_i-C_t)V/m$$

where $C_i$ is the initial concentration (mg/L), $C_t$ is the concentration (mg/L) of $NO_3^-$ after ion-exchange, V is the volume of solution (L), and m is the mass of samples on dry basis (g).

In the ion-exchange isotherm experiment, the experiment proceeded in both a pure (100 mg/L of $NO_3^-$) and a simulated $NO_3^-$ solution (100 mg/L of $NO_3^-$, $SO_4^{2-}$, $Cl^-$, and $HCO_3^-$), thereby confirming the effect on the ion-exchange capacity, when competent ions are present in addition to $NO_3^-$.

Figure 15A:
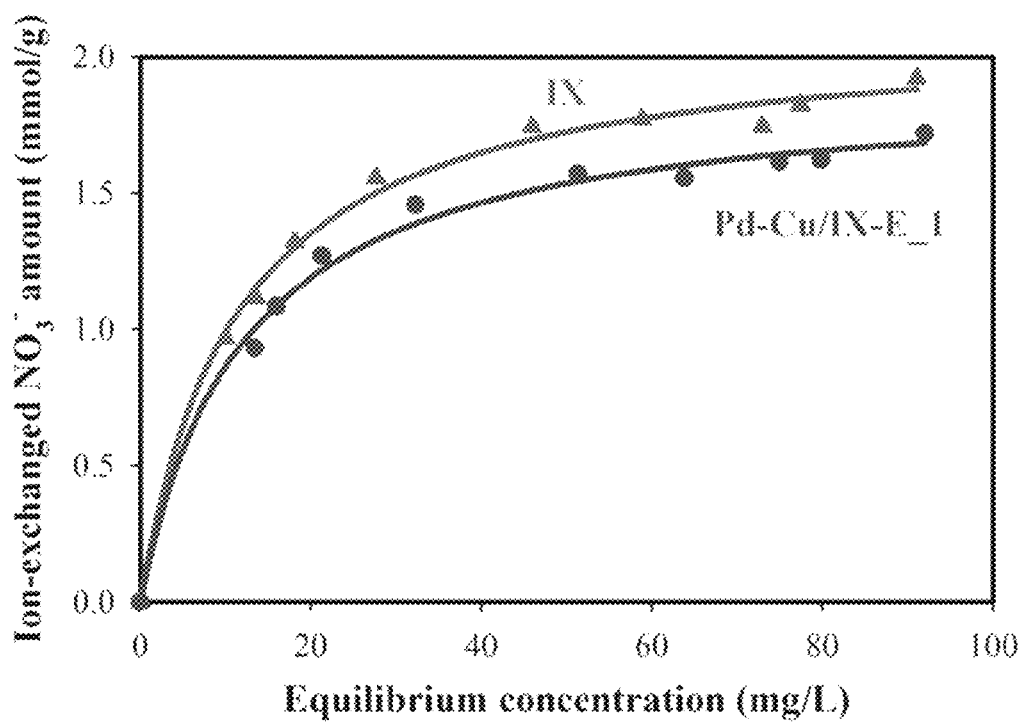
FIGS. 15(a) and 15(b) are graphs comparing ion-exchange capacity and selectivity for $NO_3^-$ of an anion-exchange resin not supporting a metal (IX) and Pd—Cu/IX-E under a $NO_3^-$ equilibrium concentration according to Example 8 of the present invention, wherein 15(a) represents an experimental result in a pure solution, and 15(b) represents an experimental result in a simulated solution.
Figure 15B:
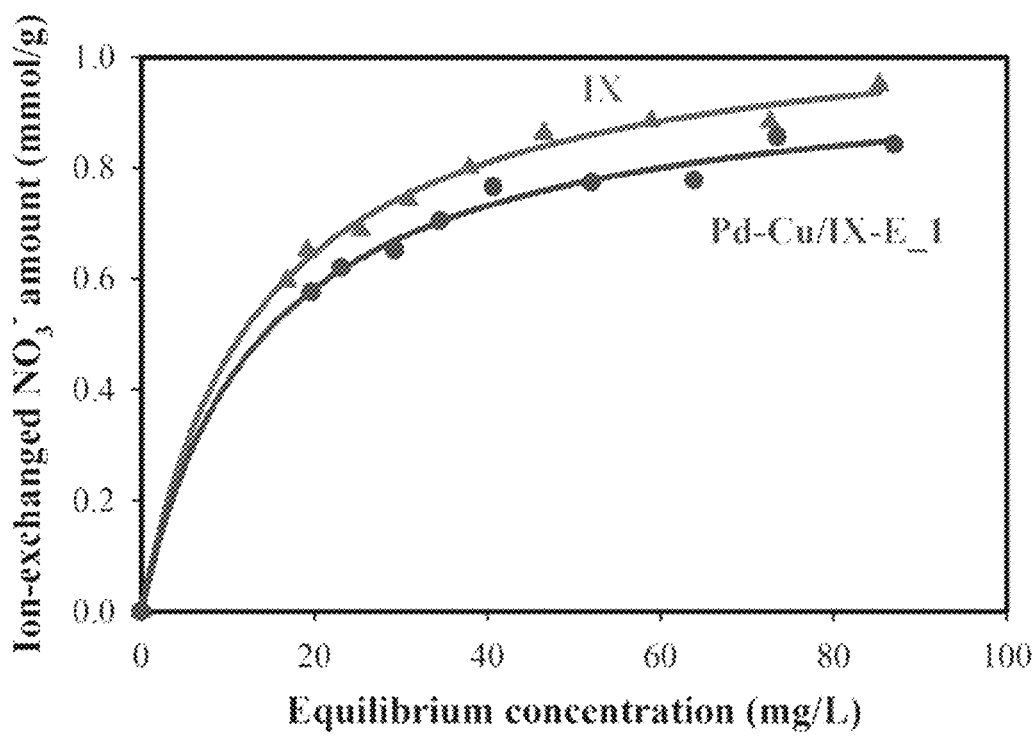

FIG. 15 shows the $NO_3^-$ ion-exchange isotherms of IX and Pd—Cu/IX-E_1 samples in the presence of a pure and a simulated $NO_3^-$ solution, respectively. All the isotherms were well fitted to the classical Langmuir model:

$$q_e=q_{max}KC_e/(1+KC_e)$$

where $q_e$ is the amount of $NO_3^-$ ion-exchanged (mmol/g), $C_e$ is the equilibrium concentration (mmol/L), $q_{max}$ is the maximum ion-exchange capacity (mmol/g), and K is the Langmuir coefficient related to ion-exchange strength (L/mmol). The solid trend lines in FIG. 15(a) and FIG. 15(b) are Langmuir fitting curves. When comparing the results of IX and Pd—Cu/IX-E_1 samples in pure and simulated solution, both samples showed smaller $q_{max}$ and K values in simulated solution. Pd—Cu/IX-E_1 showed slightly smaller $q_{max}$ than IX in a pure and simulated solution, but the difference is only marginal (less than 10%) in both solutions. Similarly, the K values of IX and Pd—Cu/IX-E_1 in both solutions are also similar. The results clearly indicate that the sequential ethanol reduction method for supporting PdCu catalysts did not significantly alter the original ion-exchange properties of IX.

Example 9: Reduction Degree of Nitrate Ion Depending on Decomposition Temperature, Decomposition Time, and Presence or Absence of Carbon Dioxide $NO_3^-$-saturated ion-exchange resins were prepared by equilibrating 400 mg samples (dry weight basis) in 1 L of 100 mg/L pure $NO_3^-$ solution for 6 h. After the ion-exchange, solid samples were collected by filtration and washed with deionized water. The wet samples were placed in a stainless-steel batch reactor (reactor volume 38 mL) and catalytic reduction experiments were carried out in two different gas atmospheres, that is, pure $H_2$ gas and mixed $H_2/CO_2$ (1/1, v/v). Prior to the catalytic reaction, the reactor was flushed with each gas (100 mL/min) for 10 min and then pressurized to 5 and 10 bar for pure $H_2$ and $H_2/CO_2$, respectively (partial pressure of $H_2$ was fixed as 5 bar). Catalytic reactions were carried out at two different temperatures, that is, 298 and 333 K. After the specified time interval, the reactor was depressurized. The ionic compositions ($NO_3^-$, $NO_2^-$, and $NH_4^+$) of the treated resins after the catalytic decomposition were carried out by secondary ion-exchange with $NO_3^-$ aqueous solution. Half of the treated resin (200 mg) was suspended in 500 mL of 100 mg/L $NO_3^-$ aqueous solution and the ionic compositions of supernatant solution were analyzed by IC. The aforementioned IC setup was used for analyzing the concentrations of anions ($NO_3^-$ and $NO_2^-$). The amount of $NO_3^-$ decomposed was assumed to be equal to the newly ion-exchanged amount of $NO_3^-$ in the second ion-exchange experiment. Thus, the degree of $NO_3^-$ decomposition in the resin was calculated by dividing the newly ion-exchanged $NO_3^-$ amount during the second ion-exchange by the ion-exchanged $NO_3^-$ amount in the first ion-exchange. The other half of the treated resin (200 mg) was suspended in 30 mL deionized water for 10 min to dissolve out $NH_4^+$ physically adsorbed on the resin. After filtration of the resin, the concentration of $NH_4^+$ in the solution was analyzed by IC using a Metrohm ion-exchange chromatography system (Metrohm 883 Basic IC plus) with 4×150 mm Metrosep C4-150 cation column. The product selectivities toward $NO_2^-$ and $NH_4^+$ were calculated by dividing the ionic compositions of $NO_2^-$ and $NH_4^+$ with the amount of $NO_3^-$ decomposed. The $N_2$ production selectivity was calculated by subtracting the production selectivities of $NO_2^-$ and $NH_4^+$ from unity, which is based on the earlier experimental observations showing that the production of $N_2O$ is negligible.

To investigate the catalytic reduction of $NO_3^-$ concentrated on the resin, Pd—Cu/IX-E_1 sample was pre-saturated with $NO_3^-$ ions in an excessive amount of 100 mg/L $NO_3^-$ solution for 6 h. The final ion-exchanged $NO_3^-$ amount was 1.52 mmol/g. The catalytic reduction experiments were carried out at two different temperatures (298 and 333 K) and under two different gas atmospheres, that is, pure $H_2$ and $H_2/CO_2$ (1/1, v/v). In both atmospheres, the partial pressure of $H_2$ was fixed to 5 bar. The reason that $CO_2$ was added in the latter is to neutralize $OH^-$ ions generated during the reduction of $NO_3^-$. It was repeatedly reported that $OH^-$ generated during the reaction can decrease the reaction rate and significantly enhance the formation of undesired $NH_4^+$. It was reported that pH control using acids like HCl, formic acid, and $CO_2$ can solve these problems. We chose $CO_2$ as a neutralizing agent (or pH buffer), because it is an environmentally friendly, very mild acid that would not cause a significant catalyst leaching. At a pressure of 5 bar $CO_2$, $H_2O$ showed a pH of 3.5-4.0 in a temperature range of 298-333 K. Another significant benefit of using $CO_2$ is that the acidity of $H_2O$ can be easily removed by simple depressurizing.

Figure 16A:
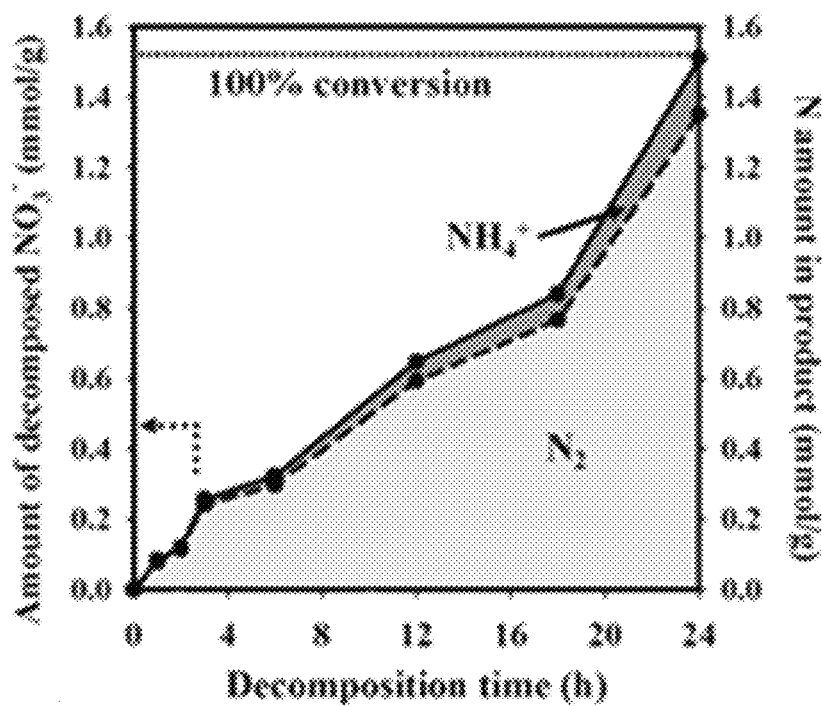
FIGS. 16(a) and 16(b) are graphs comparing $NO_3^-$ decomposition degrees over reaction time by proceeding with a decomposition reaction of ion-exchanged $NO_3^-$ at (a) 298 K and (b) 333 K after ion-exchange of $NO_3^-$ on Pd—Cu/IX-E, according to Example 9 of the present invention, under the presence of hydrogen gas.
Figure 16B:
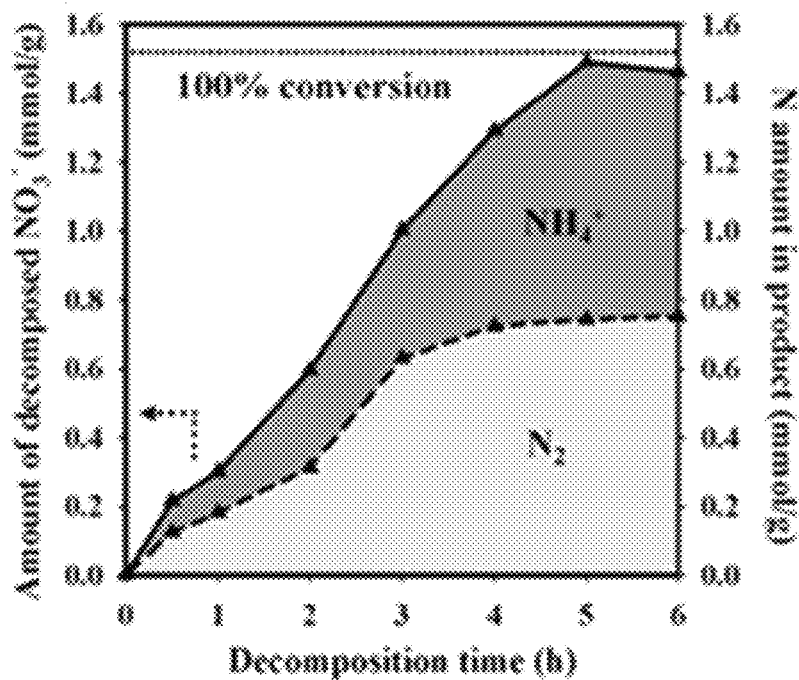
Figure 17A:
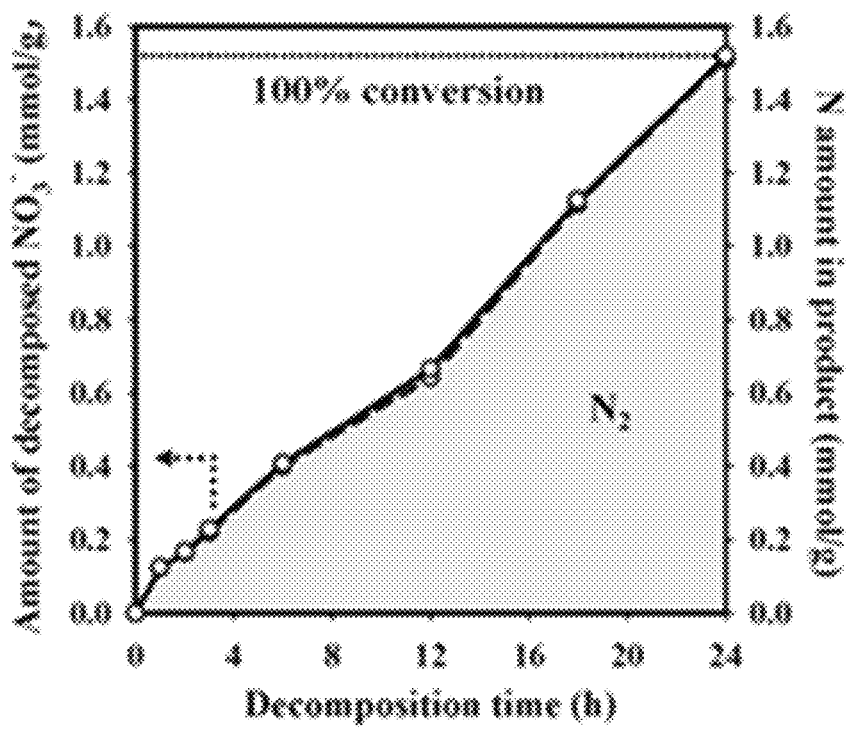
FIGS. 17(a) and 17(b) are graphs comparing $NO_3^-$ decomposition degrees over reaction time by proceeding with a decomposition reaction of ion-exchanged $NO_3^-$ at (a) 298 K and (b) 333 K after ion-exchange of $NO_3^-$ on Pd—Cu/IX-E, according to Example 9 of the present invention, under the presence of hydrogen gas and carbon dioxide gas together.
Figure 17B:
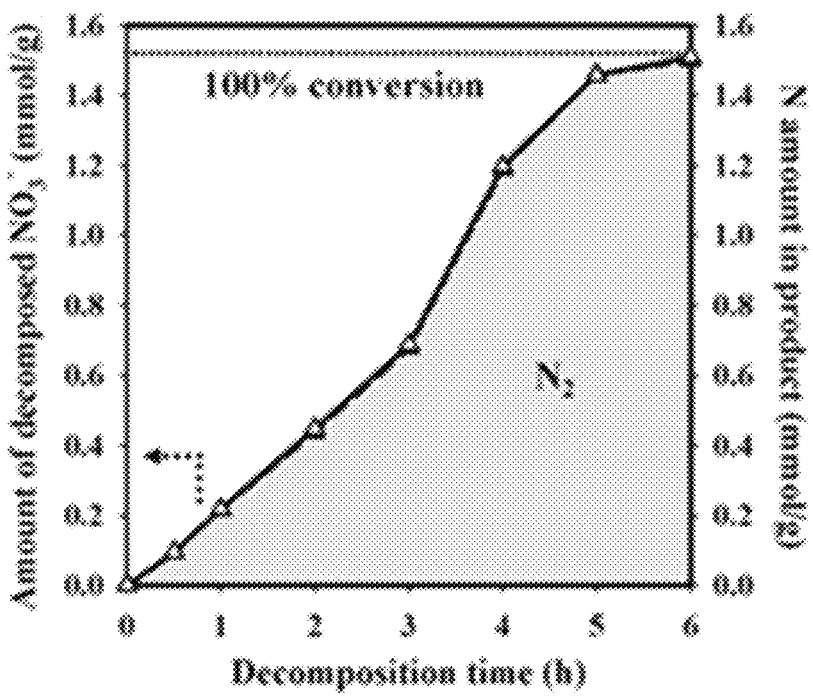

As shown in FIGS. 16(a) and 17(a), Pd—Cu/IX-E_1 showed complete $NO_3^-$ conversion after 24 h reaction at 298 K in both gas atmospheres, which indicates that the addition of $CO_2$ does not significantly affect $NO_3^-$ decomposition rate. Considering a very small metal catalyst loading, most of $NO_3^-$ ions should be ion-exchanged at the quaternary ammonium groups of the resin rather than being adsorbed on the metal catalysts. Nevertheless, the initially ion-exchanged $NO_3^-$ could be fully reduced by PdCu catalyst supported on the resin. This fact indicates that a long-range diffusion of $NO_3^-$ within the resin is possible in the present reaction time scale. All the $NO_3^-$ ions exchanged on the resin could finally reach the surface of supported PdCu catalysts presumably via consecutive ion-exchanges between the adjacent quaternary ammonium groups (ion-hopping). The thermodynamic driving force for $NO_3^-$ diffusion within the resin should be the $NO_3^-$ concentration gradient, which is created due to the decomposition of $NO_3^-$ at the catalyst surfaces. $NO_2^-$, a known reaction intermediate of $NO_3^-$ reduction, was not detected by IC in both gas atmospheres, which indicates that $NO_2^-$ is relatively unstable and facilely reduced further to $N_2$ and $NH_4^-$.

It is notable that pure $H_2$ gas produced small amounts of $NH_4^+$ after 24 h reaction (0.16 mmol/g, nitrogen molar selectivity for $NH_4^+$: 10.6%), while the use of $H_2/CO_2$ produced $N_2$ as a sole product. The enhanced $N_2$ production selectivity in the presence of $CO_2$ can be attributed to the neutralization of $OH^-$ produced during the reduction of $NO_3^-$ and $NO_2^-$ which is consistent with earlier reports. Nevertheless, it is quite surprising that $NH_4^+$ production could be completely suppressed by the addition of $CO_2$ in the present work. In earlier studies using $CO_2$ as a neutralizing agent, a reduced formation of $NH_4^+$ was reported (10-20% $NH_4^+$ selectivity), but such a complete switch-off of $NH_4^+$ formation was not demonstrated. It is notable that even the use of pure $H_2$ atmosphere showed a quite low $NH_4^+$ selectivity (10.6%) in the present work, compared with earlier reports showing >50% $NH_4^+$ selectivity. We believe that this is due to the ion-exchange ability of support resin. When $OH^-$ ions are generated on the catalyst surface via the reduction of $NO_3^-$ and $NO_2^-$, they would be rapidly captured by the ion-exchange sites (quaternary ammonium groups) of the resin, and thus an interaction between $OH^-$ and metal catalyst surface can be minimized. It is worth noting that a suspension of strongly basic ion-exchange resins in $OH^-$ form gives a neutral pH, although they have abundant amounts of strongly basic $OH^-$ ions. This is because $OH^-$ ions are fixated by the quaternary ammonium groups of the resins.

In catalytic treatments of contaminated water, increasing the reaction temperature is not relevant for field applications, because heating a large amount of contaminated water consumes a considerable amount of energy. In the present integrated system, $NO_3^-$ is concentrated in a small volume in an ion-exchange column before the catalytic decomposition process. This can significantly decrease the heat capacity of the reaction system and hence minimize the energy required for heating. Therefore, time required for the catalytic regeneration of the $NO_3^-$-saturated Pd—Cu/IX-E_1 can be shortened by heating the resin. At an elevated temperature of 333 K, the ion-exchanged $NO_3^-$ was fully converted after 6 h reaction in both gas atmospheres, which is 4-fold faster conversion compared with the reaction at 298 K. Again, the addition of $CO_2$ does not significantly affect the $NO_3^-$ decomposition rate. However, the difference in the product selectivities was much more pronounced for the two different gas atmospheres. Pure $H_2$ produced a significant amount of $NH_4^+$ after 6 h reaction (0.71 mmol/g, nitrogen molar selectivity for $NH_4^+$: 48.6%), but $H_2/CO_2$ still produced $N_2$ as a sole product. The present results show that the addition of $CO_2$ is a very efficient way of suppressing the $NH_4^+$ formation.

Example 10: Decomposition Degree Comparison of Nitrate Ion Depending on Ratios of Pd and Cu Supported on Anion-Exchange Resin It is known that in the case of Pd and Cu which are the metals mainly used together in the $NO_3^-$ decomposition reaction, the ratio between the two metals may affect the catalyst reaction. Further, depending on the decomposition reaction condition, Cu/Pd ratios representing the optimal $NO_3^-$ decomposition capacity and selectivity are different. Therefore, in Example 6, in order to find out the contents of Pd and Cu representing the optimal decomposition capacity and selectivity under the condition of the present experiment, Cu/Pd mass fraction was calculated, thereby synthesizing materials having Cu/Pd mass fractions of 0.17-1.44. Herein, the Cu/Pd mass fraction of the Pd/IX-E material supporting only Pd was 0.

In order to compare the activity for $NO_3^-$ decomposition depending on the Cu/Pd ratios, to 1 L of a high concentration of pure $NO_3^-$ solution, 0.4 g of each material was added, and stirred for 6 hours, thereby proceeding with primary ion-exchange so as to sufficient for ion-exchange of $NO_3^-$. The primary adsorption amount was calculated by analyzing the difference between the $NO_3^-$ concentration of the initial solution, and the $NO_3^-$ concentration remaining after a certain reaction time by ion chromatography. The materials completing the reaction were filtered and taken, and dried at 333 K for 2 hours. The material completing drying was added to a stainless steel reactor, and sufficiently soaked with water, and then 1:1 mixed gas of hydrogen and carbon dioxide as a reducing agent reducing ion-exchanged $NO_3^-$ on the material was flowed for 10 minutes, and the reactor was filled with pressure of 10 bar, and maintained. Herein, the reaction temperature of 298 K was maintained for 18 hours, and then the materials completing the reaction were taken, and dried at 333 K. Further, 0.4 g of Pd—Cu/IX-E_x material completing the decomposition reaction was added to 1 L of a pure solution in the same manner as the primary ion-exchange experiment first, and stirred at room temperature for 6 hours, and then the $NO_3^-$ concentration difference before and after stirring was obtained to calculate the ion-exchanged amount of $NO_3^-$ during the ion-exchange process. Herein, the amount of ion-exchanged $NO_3^-$ during the secondary ion-exchange process was assumed to the decomposed $NO_3^-$ amount during the decomposition reaction time.

Figure 18:
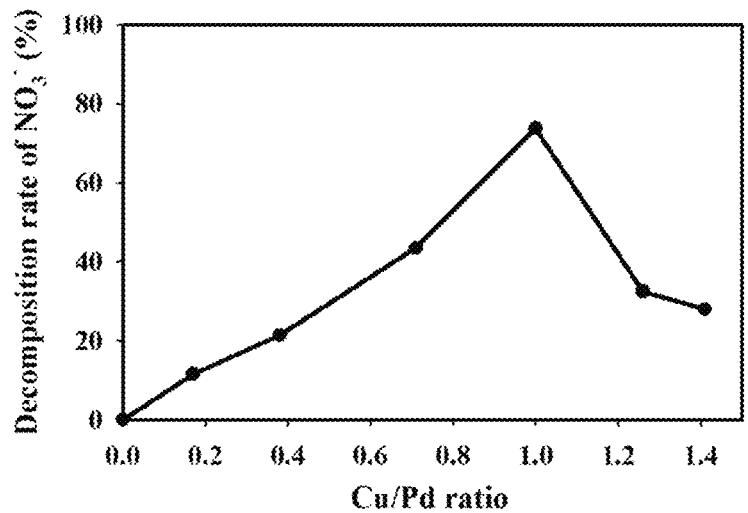
FIG. 18 is a graph comparing decomposition degrees of ion-exchanged $NO_3^-$ on materials having various ratios of Pd and Cu, according to Example 10 of the present invention, after a decomposition reaction at 298 K for 18 hours in the presence of hydrogen and carbon dioxide.

Finally, we investigated the effect of Cu/Pd alloying ratio of the catalysts on the $NO_3^-$ reduction rate (Pd loading was fixed as ~1 wt %). Pd/IX-E containing only monometallic Pd showed no activity for the decomposition of ion-exchanged $NO_3^-$ (FIG. 18), which indicates that monometallic Pd cannot catalyze $NO_3^-$ reduction. This is consistent with earlier investigations. The maximum activity was observed with an intermediate Cu/Pd ratio of unity, which is the Cu/Pd ratio of the representative Pd—Cu/IX-E_1 sample (Pd 1 wt % and Cu 1 wt %) we used in the aforementioned experiments. Earlier studies similarly reported a volcano behavior, showing a maximum $NO_3^-$ conversion rate at an intermediate Cu/Pd alloying ratio. This behavior can be explained as follows: when Cu/Pd ratio is too low (Pd-rich), the number of active sites for $NO_3^-$ reduction (Cu) is too limited, which results in a low catalytic activity; when Cu/Pd ratio is too high (Cu-rich), the number of active sites for $NO_3^-$ reduction (Cu) is sufficient, but the number of active sites for $H_2$ activation (Pd) is too limited, which again results in a low catalytic activity.

Figure 19:
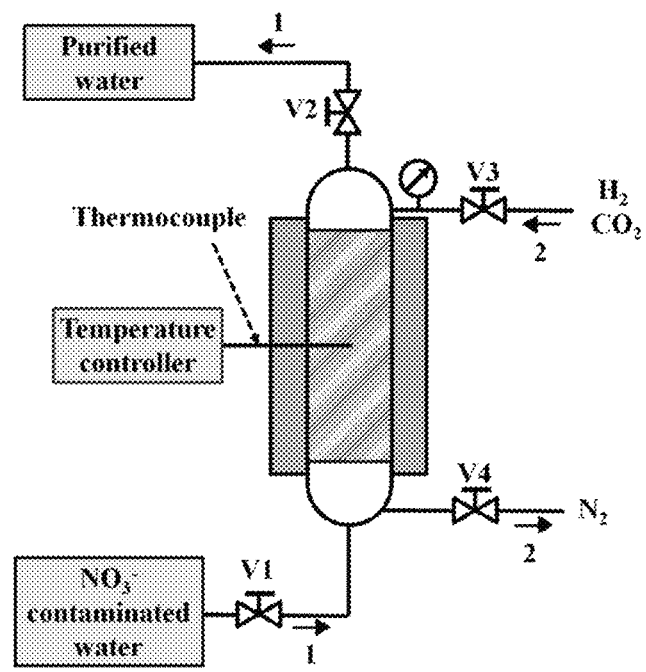
FIG. 19 is a schematic view of an ion-exchange/catalytic reduction cyclic process using a column-type reactor according to Example 11 of the present invention.

Example 11: Observation of Functional Change of Anion-Exchange Resin on which Hydrogen Activating Metal and Secondary Metal are Supported Together by Ion-Exchange/Catalytic Reduction Cyclic Experiment In order to confirm whether Pd—Cu/IX-E_1 prepared in Example 6 may be generally applied to an actual circulation process, The column tests were carried out in a stainless steel column (type 316L) having an internal diameter of 2.0 cm. Experimental setup and procedure for the ion-exchange/catalytic reduction cycle is described in FIG. 19. In a typical procedure, the column was packed with 5 g (dry weight basis) Pd—Cu/IX-E_1 sample having Cu/Pd mass ratio of unity. All column ion-exchange experiments were carried out with a simulated $NO_3^-$ solution prepared by dissolving $NaNO_3$, $Na_2SO_4$, NaCl, and $NaHCO_3$ in deionized water to contain 100 mg/L of $NO_3^-$, $SO_4^{2-}$, and $HCO_3^-$. The aqueous solution was delivered up-flow to the column at a space velocity (SV) of 6 $h^{-1}$ using a HPLC pump (Chrome Tech, Inc., P-1005). Breakthrough curves were obtained by IC analysis of successive 2 mL fractions of the effluent. When the $NO_3^-$ ion-exchange was completed, injection of a simulated $NO_3^-$ solution was stopped. After closing inlet and outlet valves for liquid transport, $H_2/CO_2$ mixed gas (1/1, v/v) was purged down-flow (100 mL/min) to the column for 5 min. Then, gas outlet valve was closed and the column was pressurized up to 10 bar. The column was kept for 24 h at while continuously refilling $H_2/CO_2$ to keep the total pressure of 10 bar. After the catalytic reduction, the column was depressurized and a simulated $NO_3^-$ solution was flowed again for the next ion-exchange experiment. The ion-exchange/catalytic reduction cycle was repeated five times.

Figure 20:
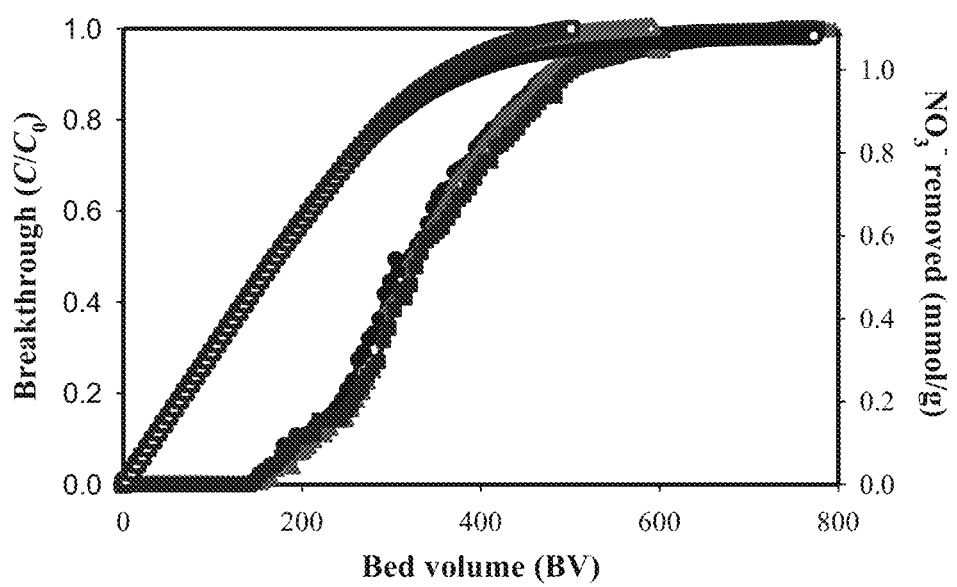
FIG. 20 shows an amount of ion-exchanged $NO_3^-$ on Pd—Cu/IX-E, and a volume of a $NO_3^-$ solution treated in each cycle, during an ion-exchange/catalytic reduction cyclic process according to Example 11 of the present invention.

FIG. 20 shows subsequent breakthrough curves and the cumulative $NO_3^-$ removal by the Pd—Cu/IX-E_1 during the five cycles of ion-exchange and catalytic reduction at 298 K. The result shows that the initial $NO_3^-$ ion-exchange capability of Pd—Cu/IX-E_1 does not change at all after the five repeated cycles. Breakthrough of a detectable concentration of $NO_3^-$ (0.01 mg/L) was observed after ~146 BVs of solution was delivered and the resin was completely saturated after ~780 BVs of solution was delivered. Upon saturation, 1.08-1.10 mmol/g $NO_3^-$ was ion-exchanged on the resin for each cycle, which is consistent with the $q_{max}$ values determined from the ion-exchange isotherm. The similar ion-exchange capacity of each cycle reveals that the catalytic reduction restores the ion-exchange sites almost completely without altering the original ion-exchange properties of the $NO_3^-$-selective ion-exchange resin.

According to embodiments of the present invention, the toxic anions may be efficiently ion-exchanged and removed using an anion-exchange resin supporting a reduction catalyst, the regeneration of the anion-exchange resin may be facilitated, and the consumption of energy and the reducing agent may be reduced, thereby being usable in removal of toxic anions from an actual water purification system.

Embodiment of the present invention has been described in detail in specific parts, and it is obvious that such specific technique is only embodiments to a person skilled in the art, without limiting the scope of the present invention. Thus, the substantial scope of the present invention will be defined by the appended claims and their equivalents.

What is claimed is:

1. An anion-exchange resin on which a hydrogen activating metal, or a hydrogen activating metal and a secondary metal is supported, in form of M/IX-L or M-S/IX-L, wherein M is a hydrogen activating metal; IX is an anion-exchange resin; L is a reducing agent which reduces a hydrogen activating metal supported on the anion-exchange resin; and S is a secondary metal belonging to non-noble metal.

2. The anion-exchange resin of claim 1, wherein the hydrogen activating metal (M) is one or more selected from the group consisting of Groups IB, VIIB and VIII metals.

3. The anion-exchange resin of claim 2, wherein the hydrogen activating metal (M) is one or more selected from the group consisting of Pd, Rh, Ir and Pt.

4. The anion-exchange resin of claim 1, wherein the secondary metal (S) is one or more selected from the group consisting of Ag, Fe, Hg, Ni, Cu, Zn, Sn and In.

5. The anion-exchange resin of claim 1, wherein the reducing agent (L) is a hydride or alcohol.

6. The anion-exchange resin of claim 5, wherein the hydride is one or more selected from the group consisting of hydrogen gas, carbon monoxide, sodium borohydride and sodium citrate.

7. The anion-exchange resin of claim 1, wherein the alcohol is one or more selected from the group consisting of methanol, ethanol, ethylene glycol and glycerol.

8. The anion-exchange resin of claim 1, wherein an ion-exchange group having an ion exchange function is stably bonded to a parent polymer having a three-dimensional structure by a covalent bond, so as to be evenly fixed and distributed on a resin surface.

9. The anion-exchange resin of claim 1, wherein the hydrogen activating metal is in a ratio of 0.01 to 50 wt %.

10. The anion-exchange resin of claim 8, wherein the parent polymer of the anion-exchange resin corresponds to a parent body to introduce a hybrid polymer or an ion exchange group therein.

11. The anion-exchange resin of claim 10, wherein the hybrid polymer is acryl and styrene, or styrene and divinylbenzene.

12. The anion-exchange resin of claim 8, wherein an ion-exchange material to be introduced to a parent body of the anion-exchange resin is one or more selected from the group consisting of weak basic groups including a primary amine group, a secondary amine group and a tertiary amine group, and a strong basic groups including a quaternary ammonium group.

13. A method of preparing an anion-exchange resin on which a hydrogen activating metal, or a hydrogen activating metal and a secondary metal is supported, the method comprising:
   (a) exchanging a negatively charged hydrogen activating metal precursor or a hydrogen activating metal precursor and a secondary metal precursor with an anion present in an anion-exchange resin, thereby supporting the metal on the anion-exchange resin; and
   (b) reducing the hydrogen activating metal or the hydrogen activating metal and the secondary metal supported on the anion-exchange resin using a reducing agent.

14. The method of preparing an anion-exchange resin of claim 13, an anion present in the anion-exchange resin is a chloride ion ($Cl^-$) or a hydroxide ion ($OH^-$).

15. The method of preparing an anion-exchange resin of claim 13, wherein the reducing agent (L) is hydride or alcohol.

16. The method of preparing an anion-exchange resin of claim 15, wherein the hydride is one or more selected from the group consisting of hydrogen gas, carbon monoxide, sodium borohydride and sodium citrate.

17. The method of preparing an anion-exchange resin of claim 13, wherein the alcohol is one or more selected from the group consisting of methanol, ethanol, ethylene glycol and glycerol.

18. The method of preparing an anion-exchange resin of claim 13, further comprising after the step (a), a step of placing the anion-exchange resin on which the hydrogen activating metal is supported in a solution containing NaOH or KOH, and stirring the solution.

19. The method of preparing an anion-exchange resin of claim 13, wherein in the step (b), organic polymerizates or an oligomer material which is a metal stabilizing material, is further added.

20. The method of preparing an anion-exchange resin of claim 19, the organic polymerizates is one or more selected from the group consisting of polyvinyl alcohol, polyvinylpyrrolidone, polyvinyl ether and cyclodextrine.

21. The method of preparing an anion-exchange resin of claim 19, a concentration of the metal stabilizing material is 0.1-100 equivalent to the supported metal concentration.

22. The method of preparing an anion-exchange resin of claim 13, the step (b) is carried out at 20 to 150° C.

23. The method of preparing an anion-exchange resin of claim 13, the hydrogen activating metal is one or more metals selected from the group consisting of Groups IB, VIIB and VIII metals.

24. The method of preparing an anion-exchange resin of claim 13, wherein the hydrogen activating metal is one or more selected from the group consisting of Pd, Rh, Ir and Pt.

25. The method of preparing an anion-exchange resin of claim 13, wherein the secondary metal is one or more selected from the group consisting of Ag, Fe, Hg, Ni, Cu, Zn, Sn and In.

26. A method of removing toxic anions, the method comprising:
   (a) carrying out ion-exchange of toxic anions using the anion-exchange resin according to claim 1; and
   (b) reducing the anion-exchange resin using a reducing agent, when the anion exchange capacity of the anion-exchange resin on which the hydrogen activating metal is supported is saturated.

27. The method of removing toxic anions of claim 26, wherein the steps (a) and (b) is repetitively carried out, using the anion-exchange resin on which the hydrogen activating metal is supported, reduced in the step (b).

28. The method of removing toxic anions of claim 26, wherein the toxic anion is a perchlorate ion ($ClO_4^-$) or a nitrate ion ($NO_3^-$).

29. The method of removing toxic anions of claim 26, wherein the toxic anion further comprises one or more oxyanion selected from the group consisting of $NO_3^-$, $NO_2^-$, $BrO_3^-$, $ClO_3^-$ and $ClO_4^-$.

30. The method of removing toxic anions of claim 26, being carried out with batch-type or in a column-type.

31. The method of removing toxic anions of claim 26, wherein the reducing agent in the step (b) is a hydrogen gas or formic acid.

32. The method of removing toxic anions of claim 26, wherein the reducing agent further comprises an acidic material selected from the group consisting of $CO_2$, HCOOH and $CH_3COOH$.

33. The method of removing toxic anions of claim 26, wherein the step (b) is carried out at 20 to 150° C.

34. The method of removing toxic anions of claim 26, wherein the step (b) is carried out under a dry or wet condition.

35. The method of removing toxic anions of claim 34, wherein a solvent under the wet condition is one or more selected from the group consisting of water, methanol, ethanol and a solvent having lower polarity or lower dielectric constant than water.

* * * * *

UNITED STATES PATENT AND TRADEMARK OFFICE
CERTIFICATE OF CORRECTION

PATENT NO. : 9,844,776 B2
APPLICATION NO. : 14/664640
DATED : December 19, 2017
INVENTOR(S) : Minkee Choi et al.

It is certified that error appears in the above-identified patent and that said Letters Patent is hereby corrected as shown below:

On the Title Page

On page 2, in the left column, at Line 12 below "Other Publications," change "Techonology," to --Technology,--.

In the Specification

At Column 1, Lines 25-38, replace the reaction formula 1 with the following:

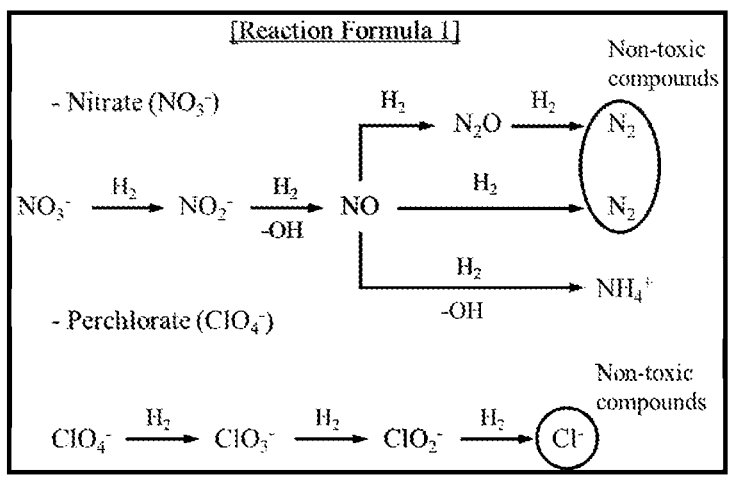

At Column 9, Lines 11-12, change "($3.8 \times 10^{-3} = 1$)" to --($3.8 \times 10^{-3}$ mol)--.

Signed and Sealed this
First Day of May, 2018

Andrei Iancu
*Director of the United States Patent and Trademark Office*